US012148987B2

(12) United States Patent
Furuhi et al.

(10) Patent No.: US 12,148,987 B2
(45) Date of Patent: Nov. 19, 2024

(54) ANTENNA MODULE, COMMUNICATION DEVICE, AND ARRAY ANTENNA

(71) Applicant: Murata Manufacturing Co., Ltd., Kyoto (JP)

(72) Inventors: Tomoshige Furuhi, Kyoto (JP); Saneaki Ariumi, Kyoto (JP); Hisao Hayafuji, Kyoto (JP); Tomoki Kato, Kyoto (JP); Yasutaka Sugimoto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 739 days.

(21) Appl. No.: 17/189,442

(22) Filed: Mar. 2, 2021

(65) Prior Publication Data

US 2021/0184344 A1 Jun. 17, 2021

Related U.S. Application Data

(63) Continuation of application No. PCT/JP2019/035606, filed on Sep. 11, 2019.

(30) Foreign Application Priority Data

Sep. 27, 2018 (JP) ................................ 2018-182098

(51) Int. Cl.

| | |
|---|---|
| ***H01Q 1/42*** | (2006.01) |
| ***H01Q 1/22*** | (2006.01) |
| ***H01Q 13/18*** | (2006.01) |
| ***H01Q 21/06*** | (2006.01) |

(52) U.S. Cl.

CPC ........... *H01Q 1/422* (2013.01); *H01Q 1/2283* (2013.01); *H01Q 13/18* (2013.01); *H01Q 21/065* (2013.01)

(58) Field of Classification Search

CPC ...... H01Q 1/422; H01Q 1/2283; H01Q 13/18; H01Q 21/065

See application file for complete search history.

(56) References Cited

U.S. PATENT DOCUMENTS

2017/0222316 A1 8/2017 Mizunuma et al.

FOREIGN PATENT DOCUMENTS

| | | | | | |
|---|---|---|---|---|---|
| JP | H02-256305 A | | 10/1990 | | |
| JP | H11-150373 A | | 6/1999 | | |
| JP | 2000-138525 A | | 5/2000 | | |
| JP | 2006229871 A | * | 8/2006 | | |
| WO | WO-2016063759 A1 | * | 4/2016 | ............. | H01L 23/66 |

OTHER PUBLICATIONS

International Search Report for PCT/JP2019/035606 dated Oct. 8, 2019.

Written Opinion for PCT/JP2019/035606 dated Oct. 8, 2019.

* cited by examiner

*Primary Examiner* — Henry Luong

(74) *Attorney, Agent, or Firm* — Pearne & Gordon LLP

(57) ABSTRACT

An antenna module (100) includes a dielectric substrate (160) having a multilayer structure, a first radiation electrode (122), a second radiation electrode (121), and a ground electrode (GND). The second radiation electrode (121) is arranged between the first radiation electrode (122) and the ground electrode (GND) in a lamination direction of the dielectric substrate (160). In the dielectric substrate (160), a hollow portion (150) is disposed in at least a portion between the first radiation electrode (122) and the second radiation electrode (121).

17 Claims, 22 Drawing Sheets

ANTENNA MODULE, COMMUNICATION DEVICE, AND ARRAY ANTENNA

CROSS REFERENCE TO RELATED APPLICATION

This is a continuation of International Application No. PCT/JP2019/035606 filed on Sep. 11, 2019 which claims priority from Japanese Patent Application No. 2018-182098 filed on Sep. 27, 2018. The contents of these applications are incorporated herein by reference in their entireties.

BACKGROUND OF THE DISCLOSURE

Field of the Disclosure

The present disclosure relates to an antenna module, a communication device, and an array antenna and more specifically to a technique for broadening the antenna module.

Description of the Related Art

International Publication No. 2016/063759 (Patent Document 1) discloses a patch antenna in which a plurality of radiation electrodes (feed elements, parasitic elements) having a planar shape are stacked.

Patent Document 1: International Publication No. 2016/063759

BRIEF SUMMARY OF THE DISCLOSURE

For the above antenna, permittivity of a dielectric substrate on which antenna elements (radiation electrodes) are implemented has an effect on its antenna characteristics, such as a frequency band width, a peak gain, and a loss of a transmittable radio-frequency signal. Among them, the frequency band width typically increases with the increase in the thickness of the dielectric substrate (that is, the distance between a radiation electrode and a ground electrode and the distance between radiation electrodes).

In particular, mobile terminals, such as smartphones, have been increasingly required to be thinner in recent years, and thus an antenna module itself has been needed to be more compact and thinner. If a dielectric substrate becomes thinner, however, an issue arises in that the frequency band width of the antenna becomes narrower.

The present disclosure is made to solve that problem, and an object thereof is to achieve a broad band without increasing the size of an antenna module.

An antenna module includes a dielectric substrate having a multilayer structure, a first radiation electrode, a second radiation electrode, and a ground electrode. The second radiation electrode is arranged between the first radiation electrode and the ground electrode in a lamination direction of the dielectric substrate. In the dielectric substrate, a hollow portion is disposed in at least a portion between the first radiation electrode and the second radiation electrode.

In the antenna module according to the present disclosure, the hollow portion is disposed in at least the portion between the stacked two radiation electrodes. In that configuration, in comparison with an antenna module in which the dielectric substrate has no hollow portion, the effective permittivity between the two radiation electrodes is reduced. Accordingly, the broad band can be achieved without increasing the size of the antenna module.

DETAILED DESCRIPTION OF THE DISCLOSURE

Figure 1:
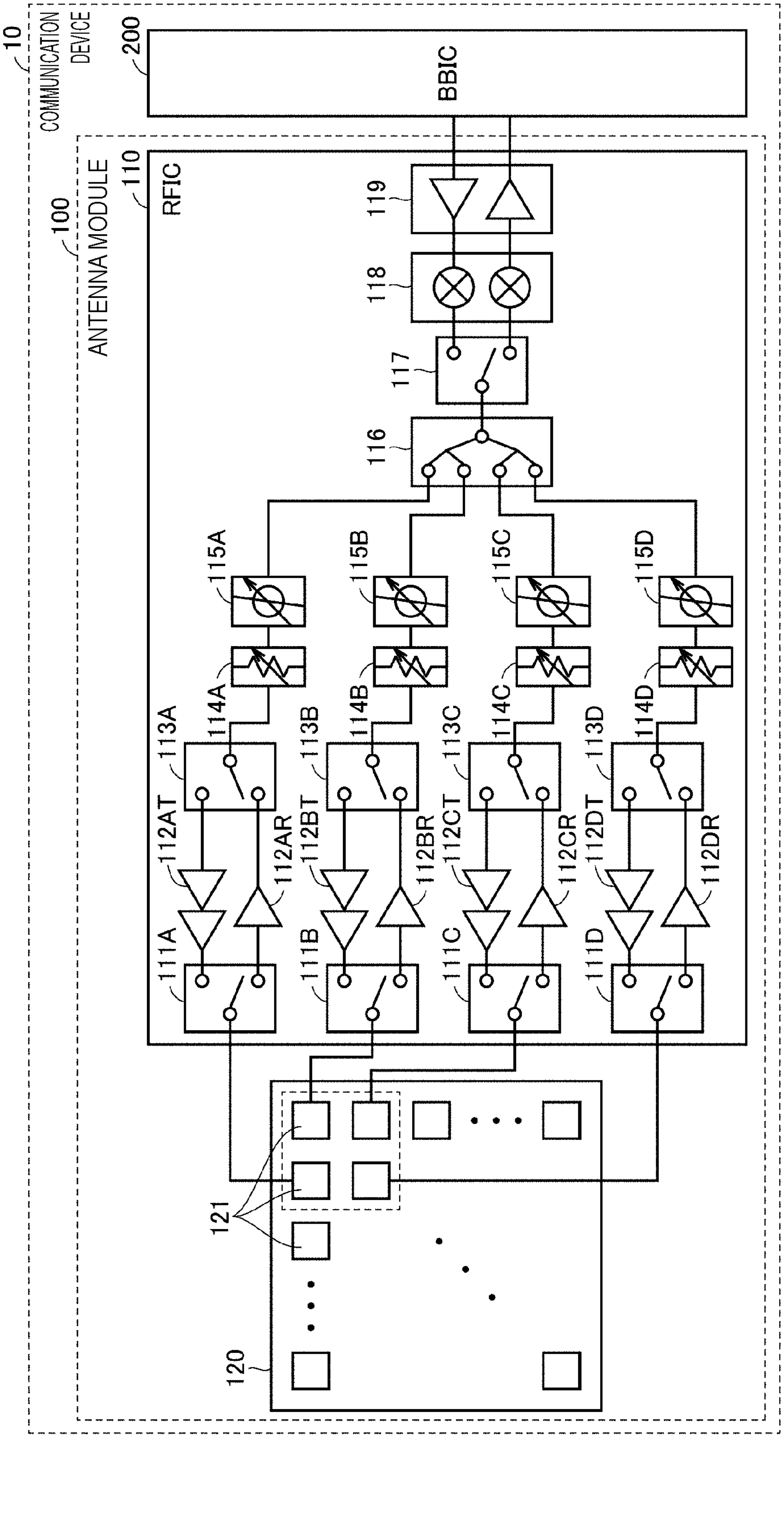
FIG. 1 is a block diagram of a communication device on which an antenna module is mounted according to a first embodiment.

Embodiments of the present disclosure are described in detail below with reference to the drawings. The same reference numerals are used in the same or corresponding sections in the drawings, and the description about them is not repeated.

First Embodiment (Basic Configuration of Communication Device)

FIG. 1 is a block diagram of an example of a communication device 10 in which an antenna module 100 according to the present embodiment is used. Examples of the communication device 10 may include a mobile terminal, such as a cellular phone, a smartphone, or a tablet, and a personal computer having the communication function.

Referring to FIG. 1, the communication device 10 includes the antenna module 100 and a base band integrated circuit (BBIC) 200 constituting a baseband signal processing circuit. The antenna module 100 includes a radio frequency integrated circuit (RFIC) 110 being one example of a feeder circuit and an antenna array 120. The communication device 10 is configured to upconvert signals conveyed from the BBIC 200 to the antenna module 100 into radio-frequency signals and radiate them from the antenna array 120, and configured to downconvert radio-frequency signals received at the antenna array 120 and perform signal-processing on the resultant signals in the BBIC 200.

In FIG. 1, for facilitating explanation, among a plurality of radiation electrodes (antenna elements) 121 constituting the antenna array 120, only a configuration corresponding to four radiation electrodes 121 is illustrated, and a similar configuration corresponding to the other radiation electrodes 121 is omitted.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner/splitter 116, a mixer 118, and an amplifier circuit 119.

In transmission of radio-frequency signals, the switches 111A to 111D and 113A to 113D are switched to the side corresponding to the power amplifiers 112AT to 112DT, and the switch 117 becomes connected to a transmission-side amplifier in the amplifier circuit 119. In reception of radio-frequency signals, the switches 111A to 111D and 113A to 113D are switched to the side corresponding to the low-noise amplifiers 112AR to 112DR, and the switch 117 becomes connected to a reception-side amplifier in the amplifier circuit 119.

A signal conveyed from the BBIC 200 is amplified in the amplifier circuit 119 and is upconverted in the mixer 118. The transmission signal being the upconverted radio-frequency signal is split into four signals in the signal combiner/splitter 116, and they pass through four signal paths and are fed to mutually different radiation electrodes 121. At that time, the directivity of the antenna array 120 can be adjusted by individually adjusting the phase-shift degrees of the phase shifters 115A to 115D arranged in the signal paths.

Reception signals being radio-frequency signals received at the radiation electrodes 121 pass through mutually different signal paths and are combined in the signal combiner/splitter 116. The combined reception signal is downconverted in the mixer 118, is amplified in the amplifier circuit 119, and is conveyed to the BBIC 200.

One example of the RFIC 110 may be formed as a one-chip integrated circuit component having the above-described circuitry. Alternatively, equipment (switches, power amplifiers, low-noise amplifier, attenuator, phase shifter) corresponding to each of the radiation electrodes 121 in the RFIC 110 may be formed as a one-chip integrated circuit component for each corresponding radiation electrode 121.

(Structure of Antenna Module)

Figure 2:
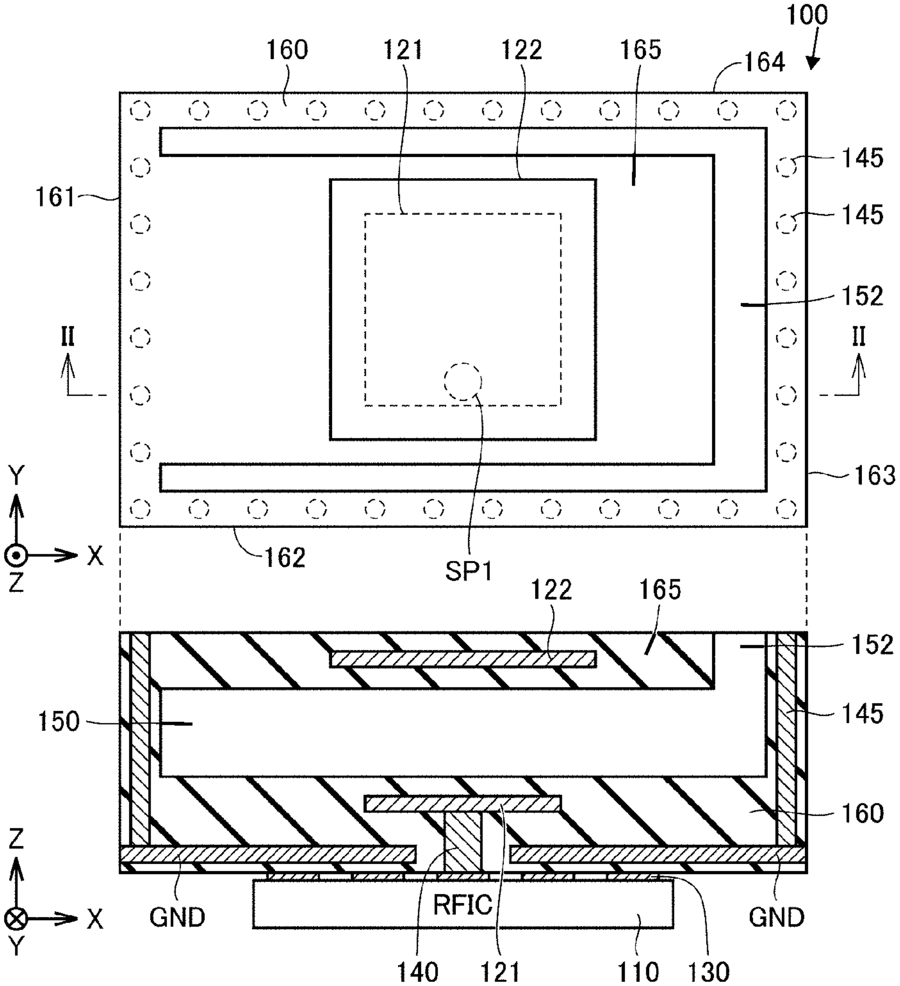
FIG. 2 includes a plan view and a cross-sectional view of the antenna module in FIG. 1.

FIG. 2 includes a plan view (upper row) and a cross-sectional view (lower row) of the antenna module 100 according to the first embodiment. Referring to FIG. 2, the antenna module 100 includes the radiation electrode 121, a radiation electrode 122, a dielectric substrate 160, a ground electrode GND, and the RFIC 110. The cross-sectional view in the lower row is taken at a plane II-II extending through a feed point SP1 for the radiation electrode 121 being a feed element in the plan view. In the following description, the positive direction and the negative direction of the Z axis in FIG. 2 may be referred to as an upper-surface side and a lower-surface side, respectively.

In the following description, an example in which the radiation electrode 121 is a feed element and the radiation electrode 122 is a parasitic element is described. Both the radiation electrode 121 and the radiation electrode 122 may be feed elements. Conversely, the radiation electrode 121 may be a parasitic element, and the radiation electrode 122 may be a feed element.

The dielectric substrate 160 has a substantially rectangular shape when the antenna module 100 is seen in plan view from the direction of the normal to the dielectric substrate 160 (Z-axis direction in the drawing) and has a first side 161 to a fourth side 164. In the example of the dielectric substrate 160 in FIG. 2, the short sides are the first side 161 and the third side 163, and the long sides are the second side 162 and the fourth side 164. The second side 162 and the fourth side 164 are adjacent to the first side 161. The third side 163 is opposite to the first side 161.

The dielectric substrate 160 has a multilayer structure in which a plurality of dielectric layers are laminated. The dielectric layers in the dielectric substrate 160 may be made of a resin, such as epoxy or polyimide. The dielectric layers may also be made by using a liquid crystal polymer (LCP) having lower permittivity, a fluorine-based resin, low temperature co-fired ceramics (LTCC), or the like. The RFIC 110 is implemented on one principal surface (lower surface) of the dielectric substrate 160 with solder bumps 130 disposed therebetween.

A plurality of columnar conductors 145 are arranged at predetermined intervals along the sides of the dielectric substrate 160 in its outer region. The plurality of columnar conductors 145 are connected to the ground electrode GND inside the dielectric substrate 160. The plurality of columnar conductors 145 function as a shield on the side-surface side of the dielectric substrate 160. In antenna modules described below with reference to FIG. 3 and the subsequent drawings, the description of the columnar conductors 145 is omitted.

The ground electrode GND is arranged on a layer near the lower surface of the dielectric substrate 160. The rectangular radiation electrode 122 (first radiation electrode) is arranged on a layer near the other principal surface (upper surface) of the dielectric substrate 160. The rectangular radiation electrode 121 (second radiation electrode) is arranged on a layer between the radiation electrode 122 and the ground electrode GND. The radiation electrode 121 and the radiation electrode 122 overlap each other such that the points of intersection of their respective diagonal lines (that is, centers) coincide when the antenna module 100 is seen in plan view. In the example illustrated in FIG. 2, the radiation electrode 122 is larger than the radiation electrode 121. However, both of the radiation electrodes may have the same size, or the radiation electrode 121 may be larger.

The radiation electrode 121 is electrically connected to the RFIC 110 with a feed line 140 disposed therebetween. The feed line 140 extends through the ground electrode GND and is connected to the feed point SP1 for the radiation electrode 121. The feed point SP1 is arranged in a position displaced from the center of the radiation electrode 121 toward the second side 162, which extends along the X axis, on the radiation electrode 121. Thus, the radiation electrode 121 radiates a radio wave whose polarization direction is the Y-axis direction.

When the radiation electrode 122 is the feed element, one example of the feed line 140 may extend through the radiation electrode 121 and be connected to a feed point for the radiation electrode 122 by a via extending through a hollow portion 150. Alternatively, the feed line 140 may be diverted around the hollow portion 150, extend inside the dielectric substrate 160, and be connected to the radiation electrode 122.

In the dielectric substrate 160, the hollow portion 150 is disposed in a layer between the radiation electrodes 121 and 122. The dielectric substrate 160 includes a layer 165 supported by the first side 161 (hereinafter also referred to as "beam portion") on the upper-surface side of the hollow portion 150, and the radiation electrode 122 is arranged in the beam portion 165. A cavity portion 152 is disposed along the second side 162 to the fourth side 164 around the beam portion 165, and the cavity portion 152 extends through the dielectric substrate 160 to the hollow portion 150.

It is known that in the above-described stack-type antenna module including the plurality of radiation electrodes stacked, the frequency band width of radio waves that can be radiated by the radiation electrodes is determined by the strength of electromagnetic-field coupling between the radiation electrode and the ground electrode and the strength of electromagnetic-field coupling between the radiation electrodes. As the strength of electromagnetic-field coupling increases, the frequency band width decreases, and as the strength of electromagnetic-field coupling decreases, the frequency band width increases.

Typically, an increase in the thickness of the dielectric substrate is needed for expanding the frequency band width of a radio wave radiated by a radiation electrode. The increased thickness of the dielectric substrate, however, may be a hindrance to a reduction in size and thickness of a communication device, such as a smartphone, that uses an antenna module and that is required to be smaller and thinner.

Here, the effective permittivity between the two electrodes also has an effect on the strength of electromagnetic-field coupling. More specifically, as the effective permittivity increases, the electromagnetic-field coupling becomes stronger, and as the effective permittivity decreases, the electromagnetic-field coupling becomes weaker. That is, the frequency band width can be expanded by a reduction in the effective permittivity between the two electrodes.

In the antenna module 100 according to the first embodiment, as described above, the hollow portion 150 is disposed between the radiation electrodes 121 and 122. Typically, the permittivity of air is lower than that of the dielectric forming the dielectric substrate 160. Thus, the effective permittivity between the radiation electrodes 121 and 122 can be reduced by the presence of the hollow portion 150. That can result in weakened electromagnetic-field coupling between the radiation electrodes 121 and 122. Accordingly, in the antenna module 100 according to the first embodiment, the frequency band width can be expanded without increasing the overall size of the module.

Because the loss of electric energy inside the dielectric can be reduced by the presence of the hollow portion 150, the efficiency of the antenna module can be improved.

(Simulation Results)

Figure 3:
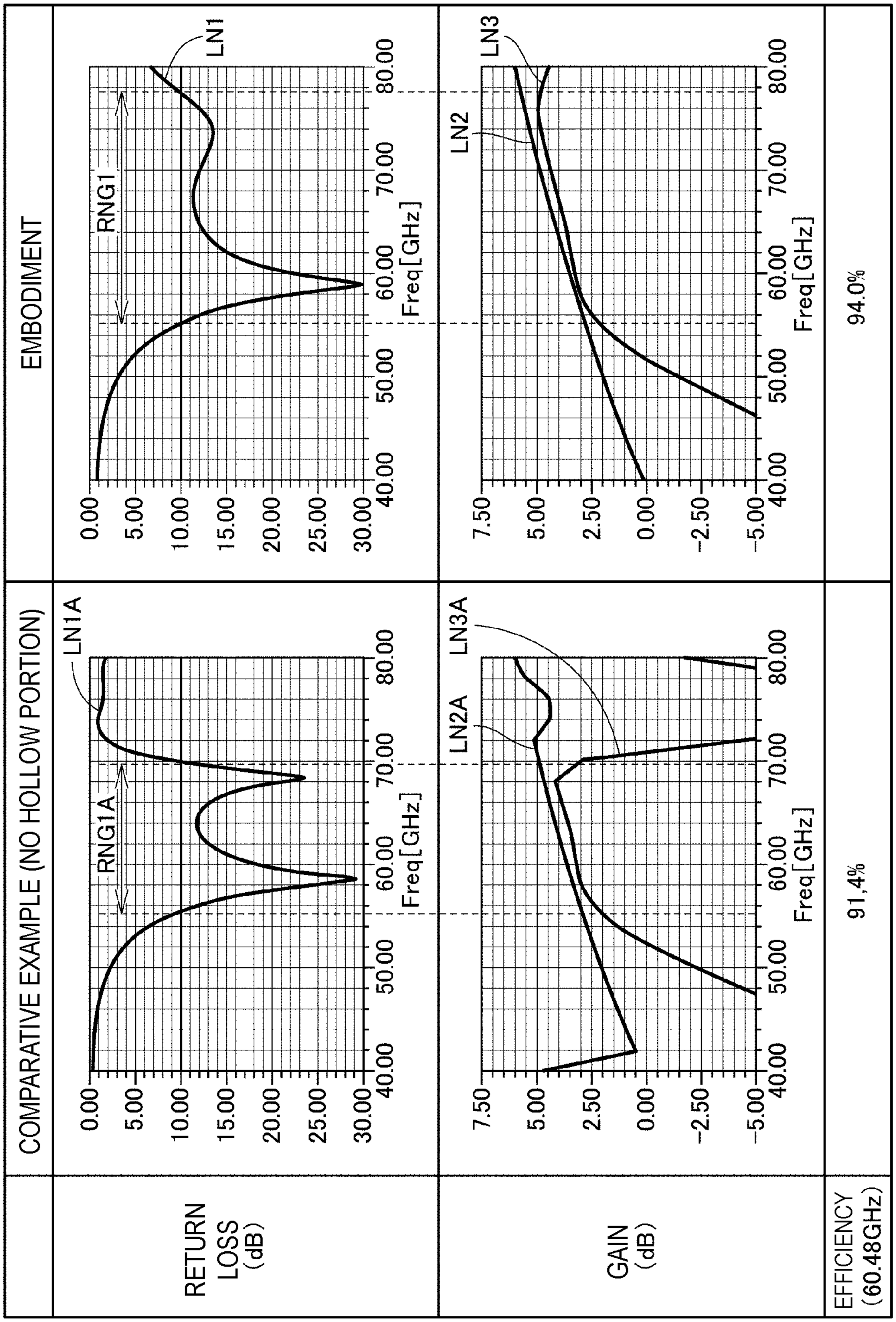
FIG. 3 is an illustration for explaining the comparison between antenna characteristics of the antenna module according to the first embodiment and those according to a comparative example.

FIG. 3 illustrates the simulation results of the comparison between the antenna characteristics of the antenna module 100 according to the first embodiment and those of an antenna module in which the dielectric substrate does not include the hollow portion 150 (comparative example). FIG. 3 illustrates the reflection characteristic (upper row), gain (middle row), and efficiency (lower row) at a specific frequency (60.48 GHz).

In the simulation described below, an example in which the used frequency range is a millimeter-wave frequency range (gigahertz range) is described. The configuration of the present disclosure is also applicable to frequency ranges other than the millimeter wave.

Referring to FIG. 3, in the return loss in the comparative example (line LN1A in FIG. 3), the frequency range where the return loss is below 10 dB is the range of 55.4 to 69.7 GHz (RNG1A), and the frequency band width is 14.3 GHz. On the other hand, in the return loss in the first embodiment (line LN1 in FIG. 3), the frequency range where the return loss is below 10 dB is the range of 55.2 to 77.1 GHz (RNG1), and the frequency band width is 21.9 GHz. Hence, the frequency band width of the antenna module 100 according to the first embodiment is wider than that according to the comparative example.

In the graph of the gain in the middle row, the lines LN2 and LN2A indicate the gain directivity, and the lines LN3 and LN3A indicate the performance gain. The difference between the gain directivity and the performance gain is the loss in the antenna module. In the graph of the gain, the range where the gain directivity and the performance gain are close is also the above-described range RNG1A in the comparative example and the range RNG1 in the first embodiment, and it is revealed that the range where the loss is low in the antenna module 100 according to the first embodiment is wider. The efficiency at 60.48 GHz (ratio of the radiated power to the input power), which is 91.4% in the comparative example, is improved to 94.0% in the first embodiment.

Hence, in the stack-type antenna module, the frequency band width can be expanded and the efficiency can be improved by disposing the hollow portion between the two radiation electrodes.

(Variations)

Next, antenna modules 100A to 100G according to variations are described with reference to FIGS. 4 to 10.

Figure 4:
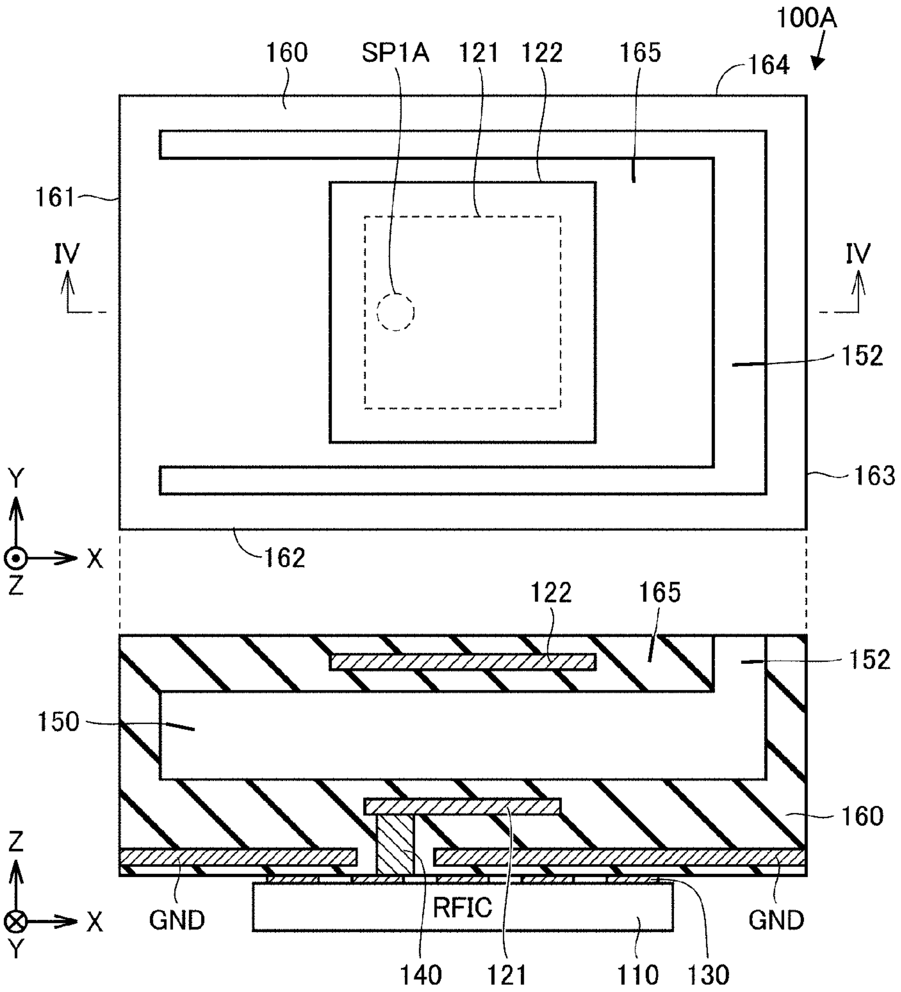
FIG. 4 includes a plan view and a cross-sectional view of an antenna module according to Variation 1.
Figure 5:
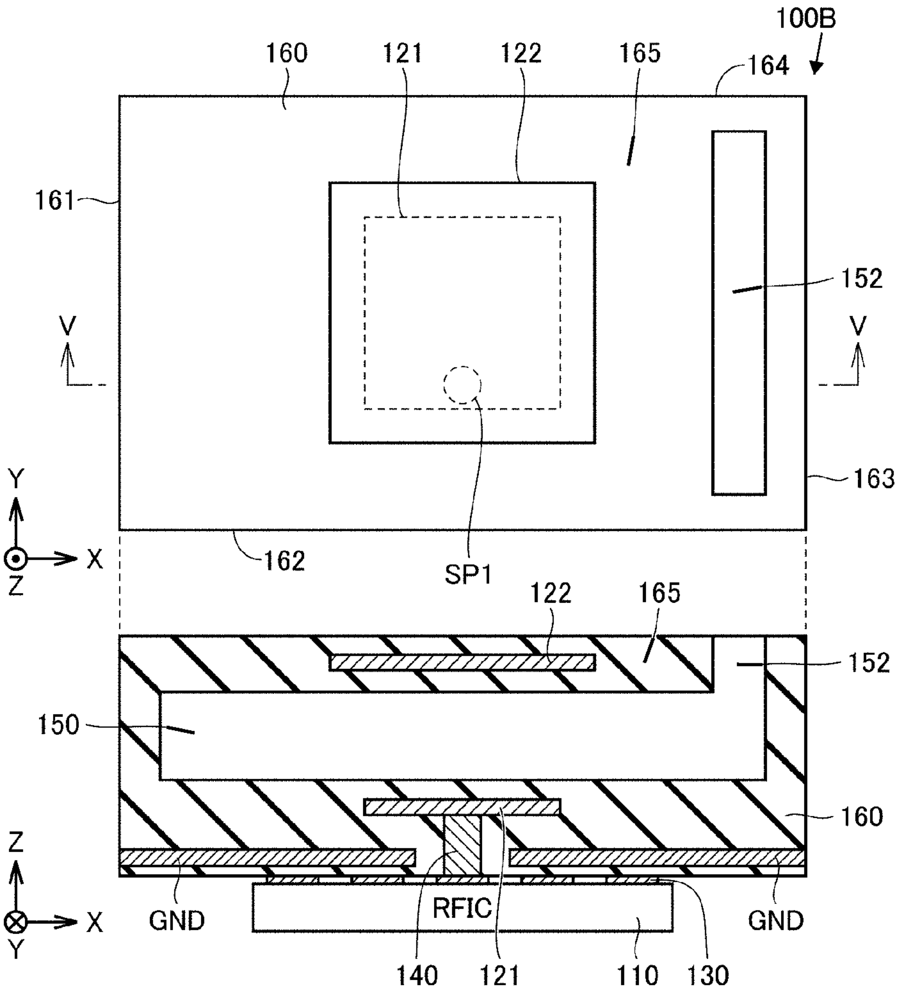
FIG. 5 includes a plan view and a cross-sectional view of an antenna module according to Variation 2.

FIG. 4 includes a plan view and a cross-sectional view of the antenna module 100A according to Variation 1. The antenna module 100A is an example that differs from the antenna module 100 in the feed point to which the feed line 140 from the RFIC 110 is connected. Specifically, a feed point SP1A for the radiation electrode 121 in the antenna module 100A is in a position displaced from the center of the radiation electrode 121 toward the first side 161. In the antenna module 100A, the polarization direction of a radio wave radiated by the radiation electrode 121 is the X-axis direction in FIG. 4.

Variations 2 to 5 in FIGS. 5 to 8 are examples that differ from the antenna module 100 in the cavity portion 152 in the upper surface of the dielectric substrate 160. Specifically, in the antenna module 100B according to Variation 2 in FIG. 5, the cavity portion 152 is disposed in only the portion along the third side 163, and the beam portion 165 is supported by the first side 161, the second side 162, and the fourth side 164.

Figure 6:
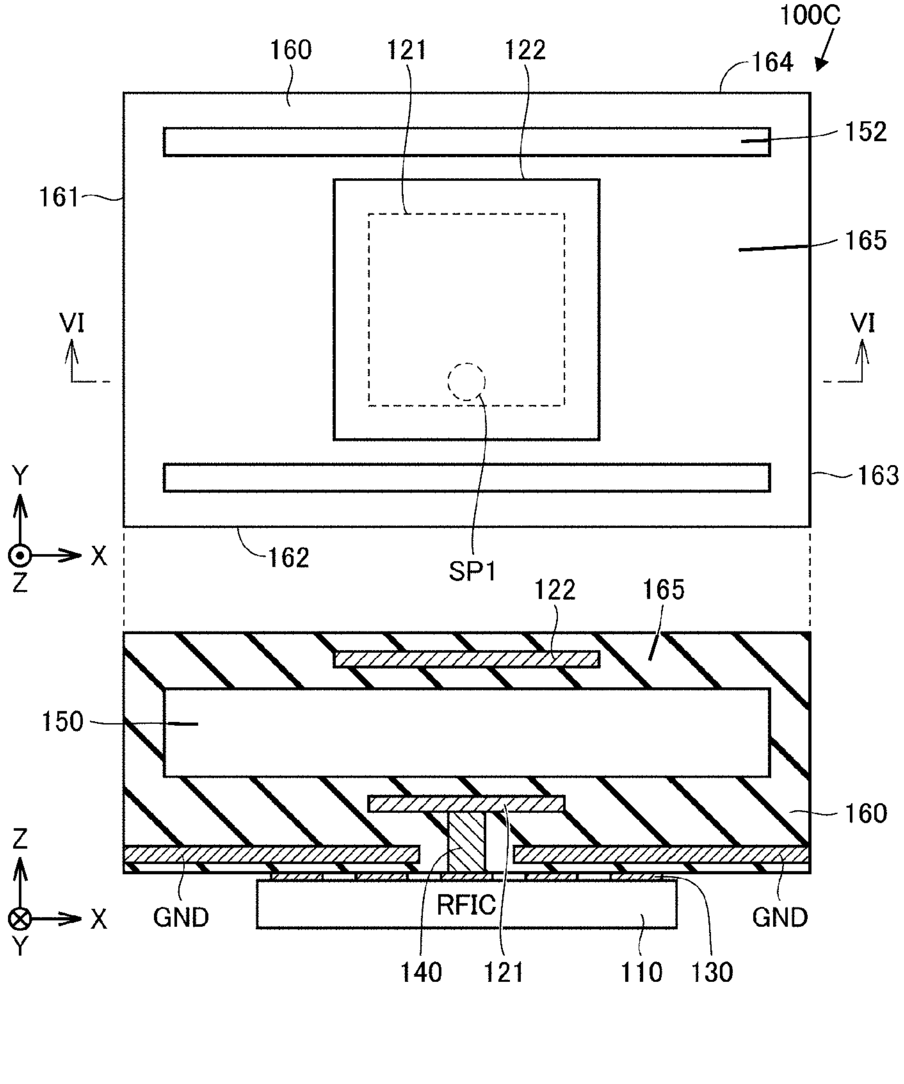
FIG. 6 includes a plan view and a cross-sectional view of an antenna module according to Variation 3.
Figure 7:
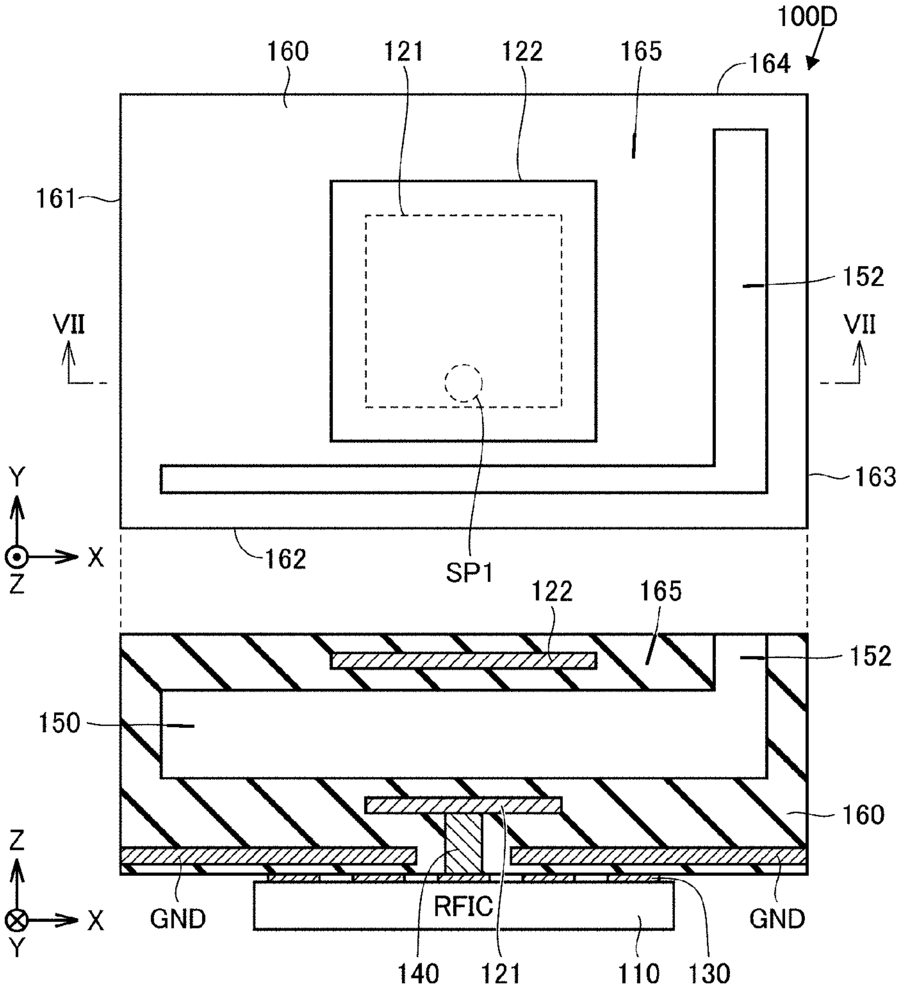
FIG. 7 includes a plan view and a cross-sectional view of an antenna module according to Variation 4.

In the antenna module 100C according to Variation 3 in FIG. 6, the cavity portion 152 is disposed in the portion along the second side 162 and the portion along the fourth side 164, and the beam portion 165 is supported by the first side 161 and the third side 163. In the antenna module 100D according to Variation 4 in FIG. 7, the cavity portion 152 is disposed in the portion along the neighboring sides (second side 162 and third side 163), and the beam portion 165 is supported by the first side 161 and the fourth side 164.

Figure 8:
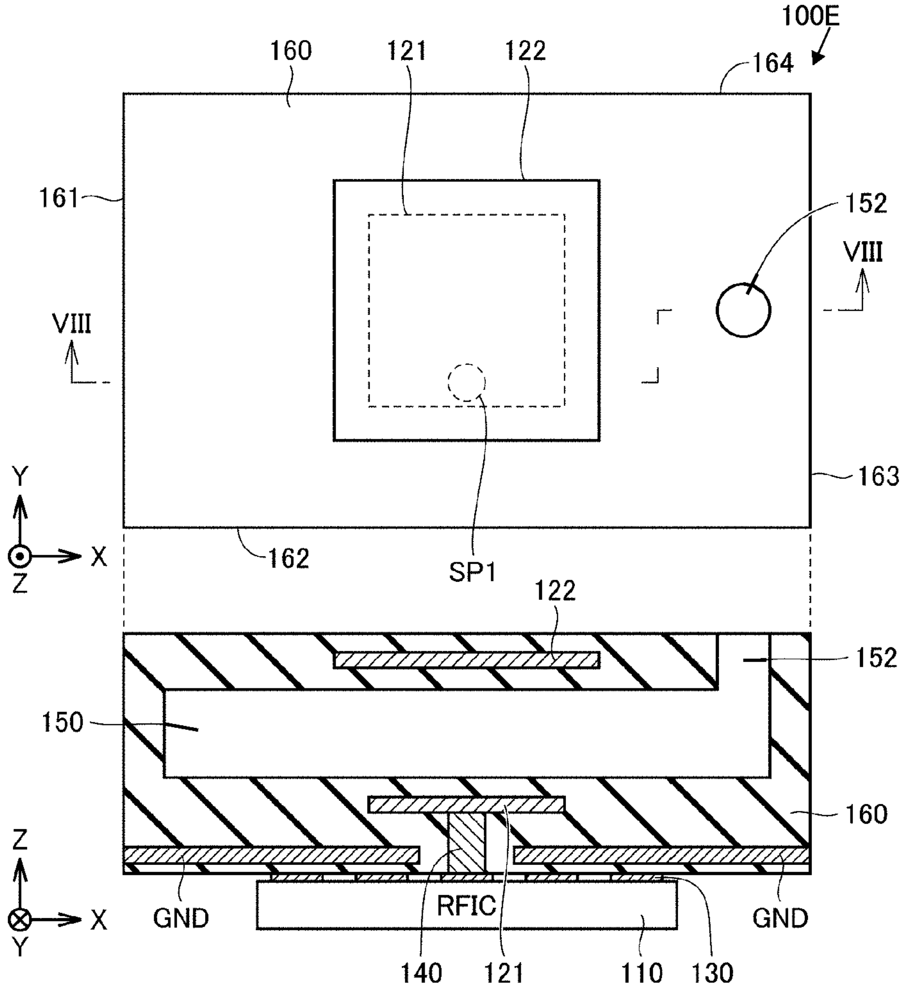
FIG. 8 includes a plan view and a cross-sectional view of an antenna module according to Variation 5.

FIG. 8 includes a plan view and a cross-sectional view of the antenna module 100E according to Variation 5. In FIG. 8, the cross-sectional view in the lower row is taken along a plane VIII-VIII extending through the feed point SP1 and the cavity portion 152. The cavity portion 152 in the antenna module 100E does not have a slit shape illustrated in FIGS. 5 to 7, has a relatively small circular shape, and is near the third side 163. The number of cavity portions 152 in FIG. 8 may be two or more. The cavity portion 152 in FIG. 8 may be disposed in a different position.

Figure 9:
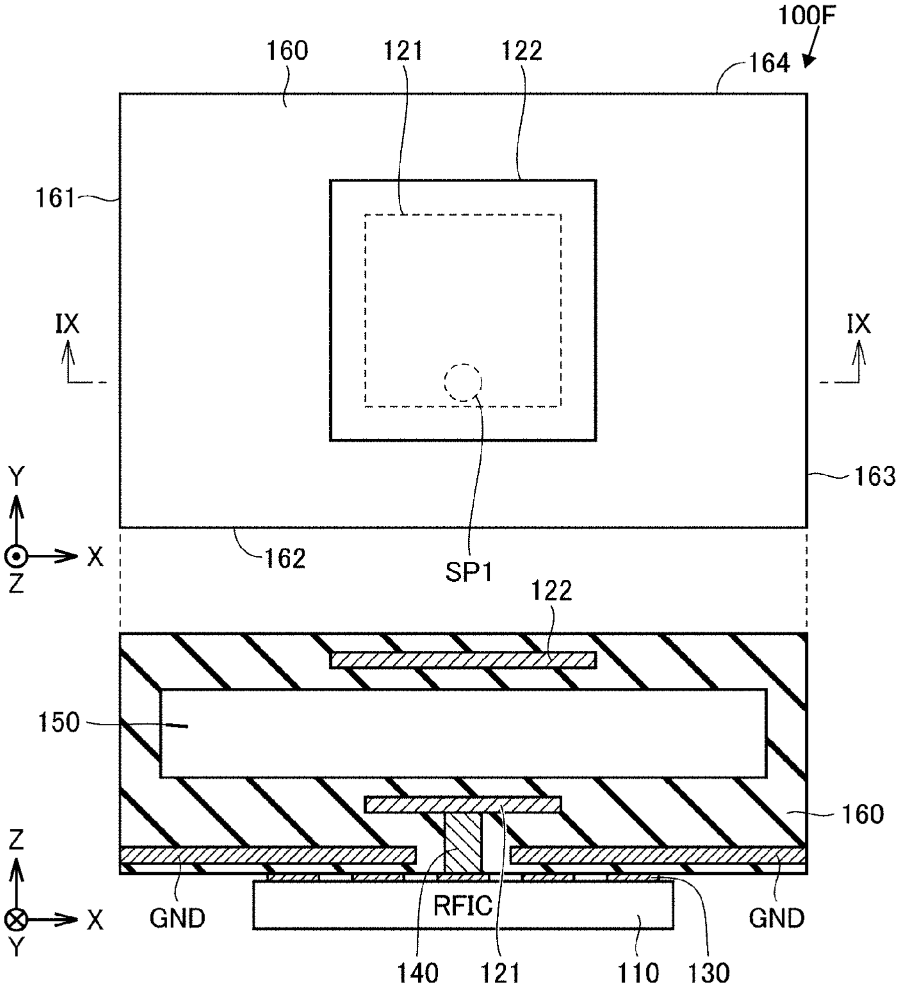
FIG. 9 includes a plan view and a cross-sectional view of an antenna module according to Variation 6.
Figure 10:
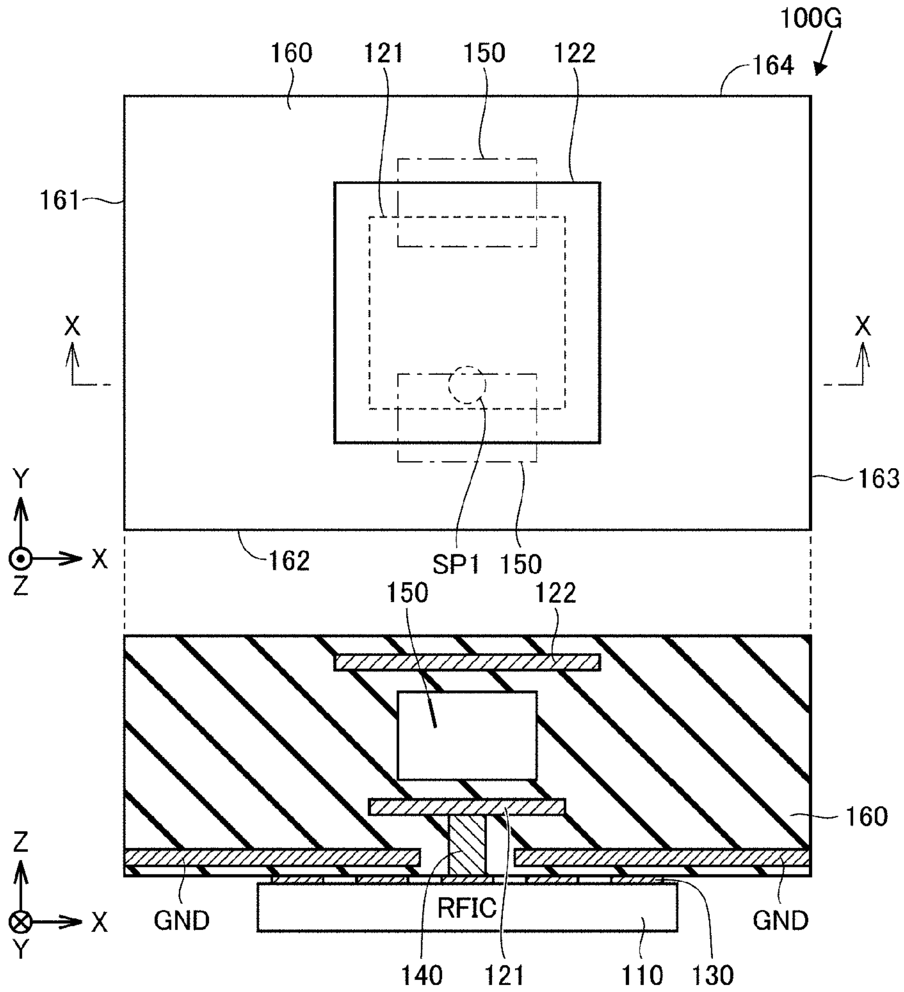
FIG. 10 includes a plan view and a cross-sectional view of an antenna module according to Variation 7.

The antenna module 100F according to Variation 6 in FIG. 9 and the antenna module 100G according to Variation 7 in FIG. 10 are examples in which the dielectric substrate 160 has no cavity portion in its upper surface and the hollow portion 150 is a closed space.

In the antenna module 100F in FIG. 9, the hollow portion 150 is disposed inside the dielectric substrate 160 such that when the antenna module 100F is seen in plan view, the hollow portion 150 overlaps the entire area of the radiation electrodes 121 and 122. In the antenna module 100G in FIG. 10, the hollow portion 150 is disposed such that it overlaps only the portion of the radiation electrodes 121 and 122 along the second side 162 and the fourth side 164 of the dielectric substrate 160.

Here, the relation between the position of the hollow portion 150 and the frequency band width in the cases where the hollow portion 150 partially overlaps a portion of the radiation electrodes, as in the antenna module 100G in FIG. 10, is described with reference to FIGS. 11 to 14.

Figure 11:
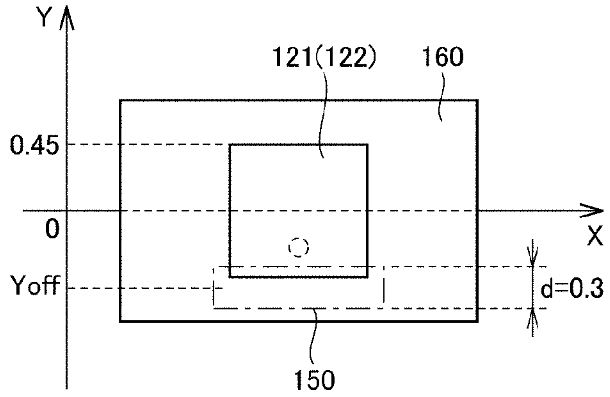
FIG. 11 is a first illustration for explaining the relation of the position of a hollow portion in a Y-axis direction and the frequency band width.

First, the relation between the position of the hollow portion in the Y-axis direction and the frequency band width is described with reference to FIGS. 11 and 12. As illustrated in FIG. 11, in an antenna module in which the length of one side of each of the two radiation electrodes (corresponding to the radiation electrodes 121 and 122) is 0.9 mm and the feed point is in a position displaced from the center of the radiation electrode toward the negative direction of the Y axis, the position of the rectangular hollow portion having the dimension in the Y-axis direction of 0.3 mm and being long in the X-axis direction is moved in the Y-axis direction. The frequency band width in that case is simulated, and its results are illustrated in FIG. 12.

Figure 12:
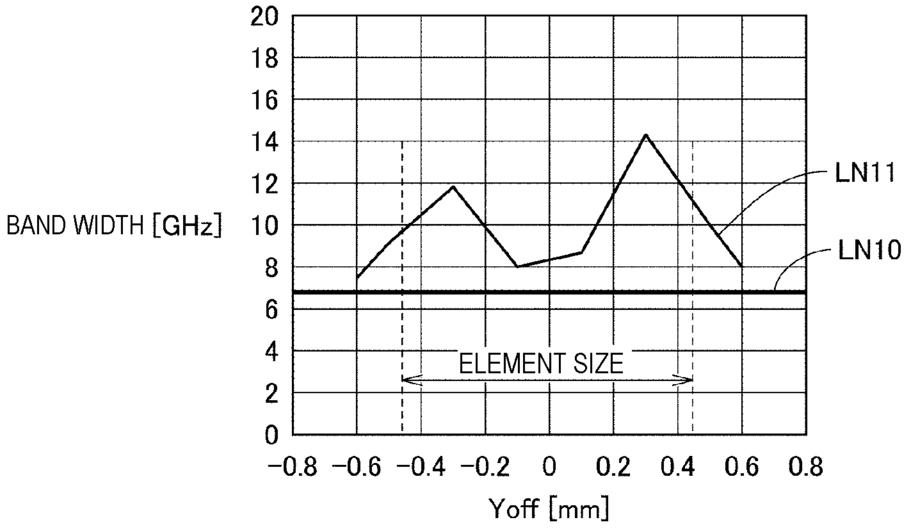
FIG. 12 is a second illustration for explaining the relation of the position of the hollow portion in the Y-axis direction and the frequency band width.

In FIG. 12, the horizontal axis indicates the displacement amount Yoff of the position of the center of the hollow portion in the Y-axis direction from the position of the center of the radiation electrode in the Y-axis direction (X axis in FIG. 11), and the vertical axis indicates the frequency band width of a radiated radio wave. The line LN10 in FIG. 12 indicates the simulation result for the frequency band width in a comparative example that has no hollow portion, and its frequency band width is 6.98 GHz.

The line LN11 in FIG. 12 indicates the simulation result for the frequency band width when the hollow portion in FIG. 11 is moved. It is revealed that in the range of $-0.6 \leq Yoff \leq 0.6$, where the hollow portion overlaps the radiation electrodes, the frequency band width wider than that in the comparative example, which has no hollow portion, is achieved. In particular, the frequency band width is large in the vicinities where Yoff is ±0.3.

In the case where a radio wave whose polarization direction is the Y-axis direction is radiated, as in FIG. 11, it is known that the intensity of an electric field occurring between two radiation electrodes is typically the largest in the vicinity of end portions of the radiation electrodes in the Y-axis direction. Accordingly, when the hollow portion is disposed in the portions where the intensity of the electric field is large, the advantage of reducing the effective permittivity is large, and that results in the increased amount of improvement in the frequency band width. On the contrary, in the vicinity of the centers of the radiation electrodes in the Y-axis direction (Yoff=0), the intensity of the electric field is lower than that in the end portions in the Y-axis direction, and thus the advantage of improving the frequency band width obtained from the presence of the hollow portion is slightly small.

Next, the relation between the position of the hollow portion in the X-axis direction and the frequency band width is described with reference to FIGS. 13 and 14. In the antenna module in which the length of one side of each of the two radiation electrodes is 0.9 mm and the polarization direction is the Y-axis direction, as in the case of FIG. 11, the frequency band width obtained when the rectangular hollow portion having the dimension in the X-axis direction of 0.3 mm and being long in the Y-axis direction is moved in the X-axis direction is simulated, and its results are illustrated in FIG. 14.

Figure 13:
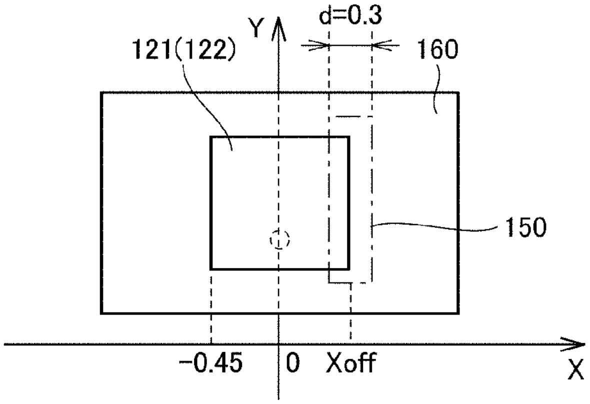
FIG. 13 is a first illustration for explaining the relation of the position of the hollow portion in an X-axis direction and the frequency band width.
Figure 14:
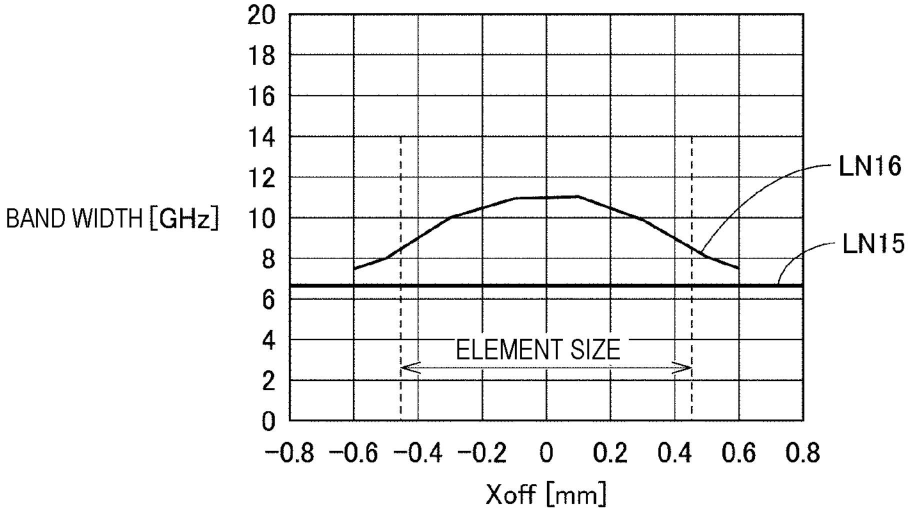
FIG. 14 is a second illustration for explaining the relation of the position of the hollow portion in the X-axis direction and the frequency band width.

In FIG. 14, the horizontal axis indicates the displacement amount Xoff of the position of the center of the hollow portion in the X-axis direction from the position of the center of the radiation electrode in the X-axis direction (Y axis in FIG. 13), as illustrated in FIG. 13, and the vertical axis indicates the frequency band width of a radiated radio wave. The line LN15 in FIG. 14 indicates the simulation result for the frequency band width in the comparative example, which has no hollow portion.

The line LN16 in FIG. 14 indicates the simulation result for the frequency band width when the hollow portion 150 in FIG. 13 is moved. It is revealed that in the range of $-0.6 \leq Xoff \leq 0.6$, where the hollow portion overlaps the radiation electrodes, the frequency band width wider than that in the comparative example, which has no hollow portion, is also achieved. Unlike the case where the position in the Y-axis direction is moved illustrated in FIGS. 11 and 12, the advantage of improving the frequency band width in the vicinity of the centers of the radiation electrodes in the X-axis direction (Xoff=0) is large, and the advantage of the improvement in the end portions in the X-axis direction is slightly smaller than that in the vicinity of the centers. That is because the feed point for the radiation electrode is on the Y axis, as illustrated in FIG. 13, and thus the electric field occurring between the two radiation electrodes is the largest in the vicinity of the centers of the radiation electrodes in the X-axis direction.

The above-described simulation results reveal that, as in the antenna module 100G in FIG. 10, in the case where the hollow portion is partially disposed between the two radiation electrodes, the hollow portion may preferably be in a position that overlaps the end portions of the radiation electrodes with respect to the polarization direction (Y-axis direction) and may preferably be in the vicinity of the centers, which are near the feed point, of the radiation electrodes with respect to a direction perpendicular to the polarization direction (X-axis direction).

As described above, in the stack-type antenna modules including the two radiation electrodes, the expanded frequency band width of a radiated radio wave can be achieved by disposing the hollow portion in at least a portion between the two radiation electrodes.

The size and position of the hollow portion 150 and the arrangement of the cavity portion 152 can be determined in accordance with a desired frequency band width and stiffness (durability) of the antenna module.

Figure 15:
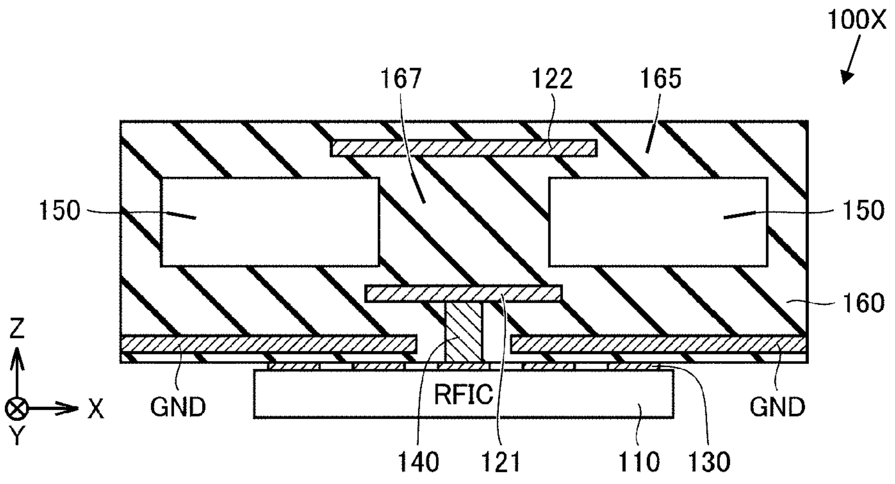
FIG. 15 is a cross-sectional view of an antenna module according to Variation 8.
Figure 16:
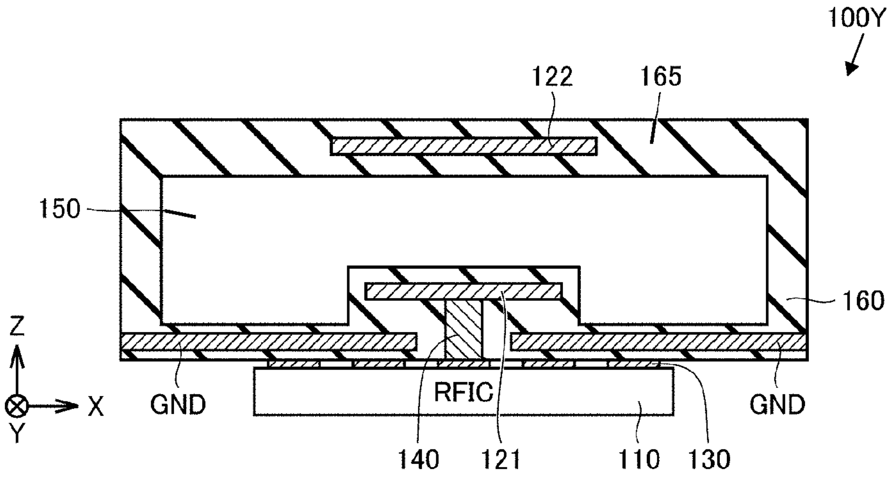
FIG. 16 is a cross-sectional view of an antenna module according to Variation 9.

The hollow portion 150 disposed inside the dielectric substrate 160 may consist of a plurality of sections separated by a dielectric wall portion 167, as in an antenna module 100X according to Variation 8 in FIG. 15. The hollow portion 150 may extend to a portion close to the ground electrode GND in a zone around the radiation electrode 121 being the feed element, as in an antenna module 100Y according to Variation 9 in FIG. 16. Furthermore, the hollow portion 150 may consist of sections separated in the lamination direction (thickness direction) of the dielectric substrate 160, as in an antenna module 100Z according to Variation 10 in FIG. 17.

Second Embodiment

In the first embodiment, the hollow portion 150 disposed inside the dielectric substrate 160 is basically an air layer.

In a second embodiment, an example in which the hollow portion 150 disposed between the two the radiation electrodes 121 and 122 is at least partially filled with another dielectric having permittivity lower than that of the dielectric substrate 160 is described.

Figure 18:
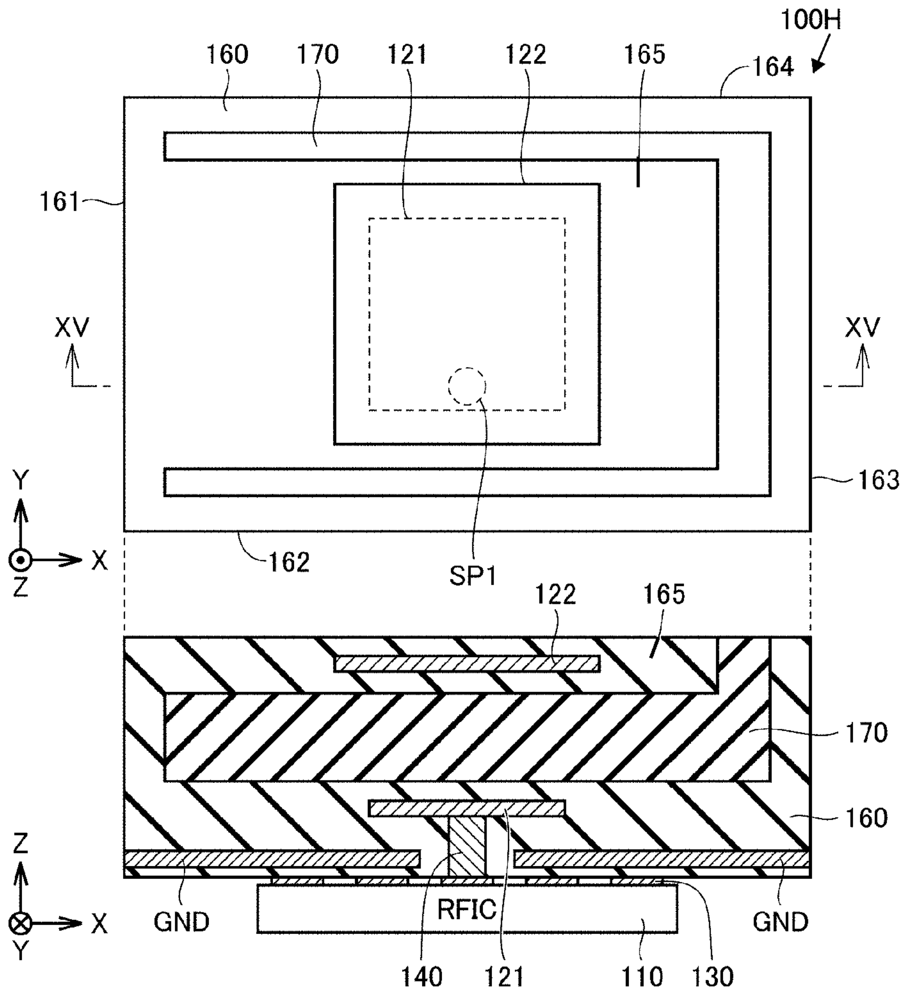
FIG. 18 includes a plan view and a cross-sectional view of an antenna module according to a second embodiment.

FIG. 18 includes a plan view and a cross-sectional view of an antenna module 100H according to the second embodiment. The antenna module 100H is the one in which the hollow portion 150 and the cavity portion 152 in the antenna module 100 according to the first embodiment are filled with a dielectric material 170 having permittivity lower than that of the dielectric forming the dielectric substrate 160.

Because the hollow portion 150 is filled with the different dielectric material having the lower permittivity, the effective permittivity can be more reduced than that in the case where the substrate is entirely made of the same dielectric material, and the frequency band width can be expanded. In that configuration, although the amount of expansion of the frequency band width is smaller than that in the case where the hollow portion 150 is the air layer, the stiffness of the antenna module can be enhanced. In the antenna module 100H, the hollow portion 150 is entirely filled with another dielectric material. The hollow portion 150 may be only partially filled with another dielectric material.

Figure 19:
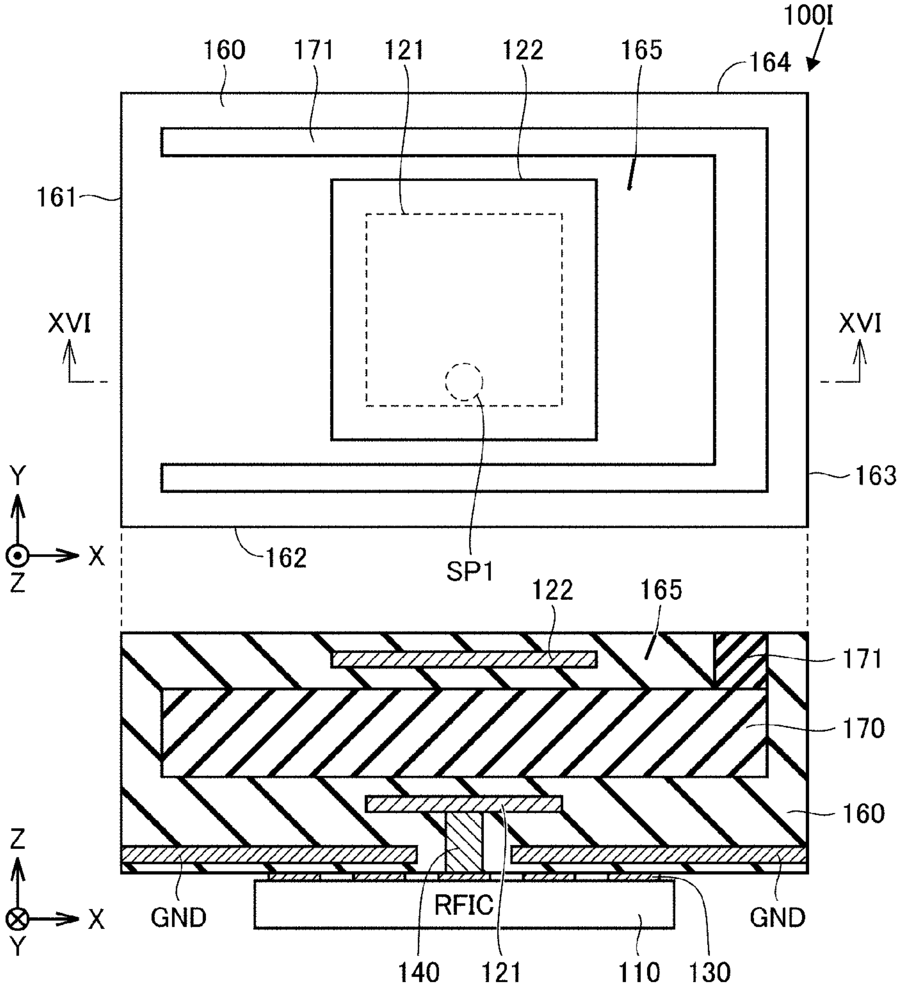
FIG. 19 includes a plan view and a cross-sectional view of an antenna module according to Variation 11.

As in an antenna module 100I according to Variation 11 in FIG. 19, the cavity portion 152 may be filled with a dielectric material 171 different from the dielectric material 170 with which the hollow portion 150 is filled.

Figure 20:
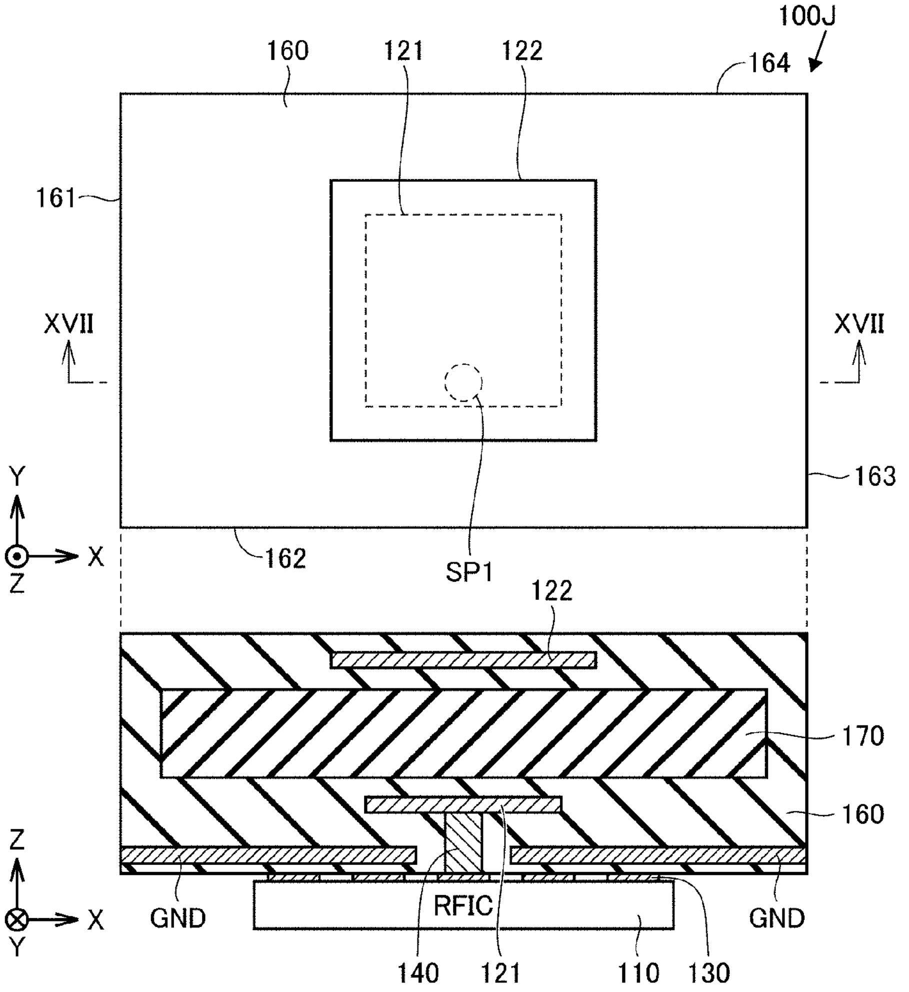
FIG. 20 includes a plan view and a cross-sectional view of an antenna module according to Variation 12.
Figure 21:
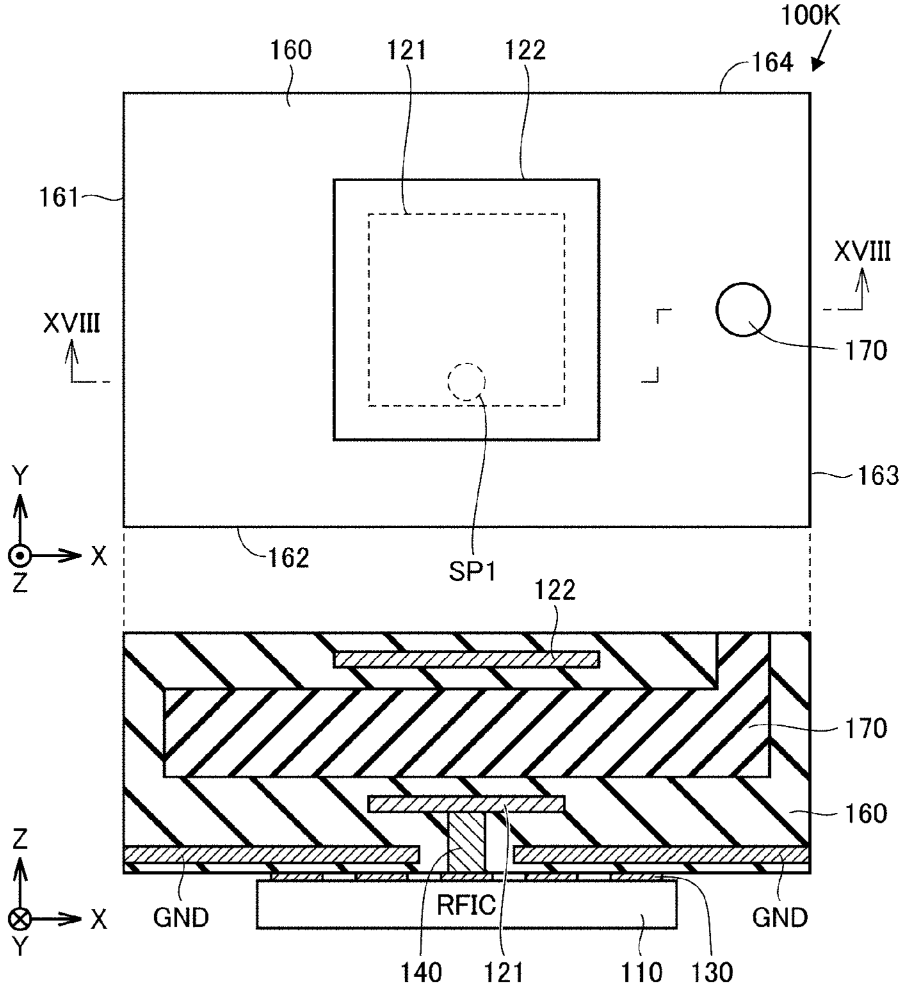
FIG. 21 includes a plan view and a cross-sectional view of an antenna module according to Variation 13.

Similarly, the hollow portion 150 in each of the variations of the first embodiment may be filled with a dielectric material having low permittivity. For example, an antenna module 100J according to Variation 12 in FIG. 20 is the one in which the hollow portion 150 in the antenna module 100F according to Variation 6 of the first embodiment is filled with the different dielectric material 170. An antenna module 100K according to Variation 13 in FIG. 21 is the one in which the hollow portion 150 in the antenna module 100E according to Variation 5 of the first embodiment is filled with the different dielectric material 170.

Third Embodiment

The antenna module in the first embodiment has the configuration in which the two radiation electrodes are stacked. The number of radiation electrodes stacked may be three or more.

In a third embodiment and its variations, examples in which the same configuration as that of the first embodiment is applied to an antenna module including three stacked radiation electrodes are described.

Figure 22:
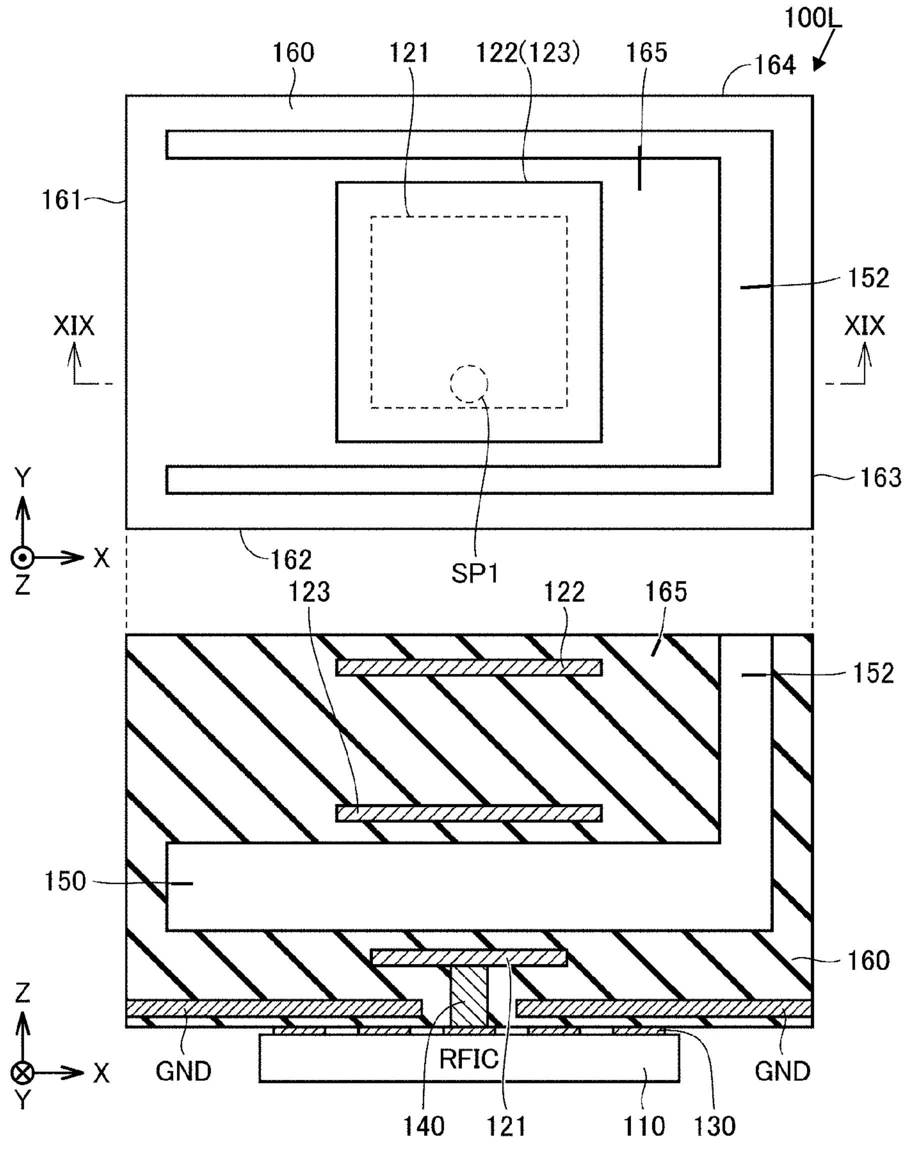
FIG. 22 includes a plan view and a cross-sectional view of an antenna module according to a third embodiment.

FIG. 22 includes a plan view and a cross-sectional view of an antenna module 100L according to the third embodiment. The antenna module 100L in FIG. 22 further includes a radiation electrode 123 (third radiation electrode) being a parasitic element, in addition to the radiation electrode 121, which is a feed element, and the radiation electrode 122, which is a parasitic element.

The radiation electrode 123 is disposed on a layer between the radiation electrodes 121 and 122. In the example of the antenna module 100L, the radiation electrodes 122 and 123 have the same dimensions and the same shape, and when the antenna module 100L is seen in plan view, the radiation electrodes 122 and 123 overlap each other.

The hollow portion 150 is disposed between the radiation electrodes 121 and 123, and the cavity portion 152 extends from the upper surface of the dielectric substrate 160 through the dielectric substrate 160 to the hollow portion 150. The cavity portion 152 in the antenna module 100L is disposed along the second side 162, the third side 163, and the fourth side 164 of the antenna module 100L having a rectangular shape as seen in plan view, as in the case of the antenna module 100 according to the first embodiment. The radiation electrodes 122 and 123, which are parasitic elements, are arranged in the beam portion 165 supported by the first side 161.

Figure 23:
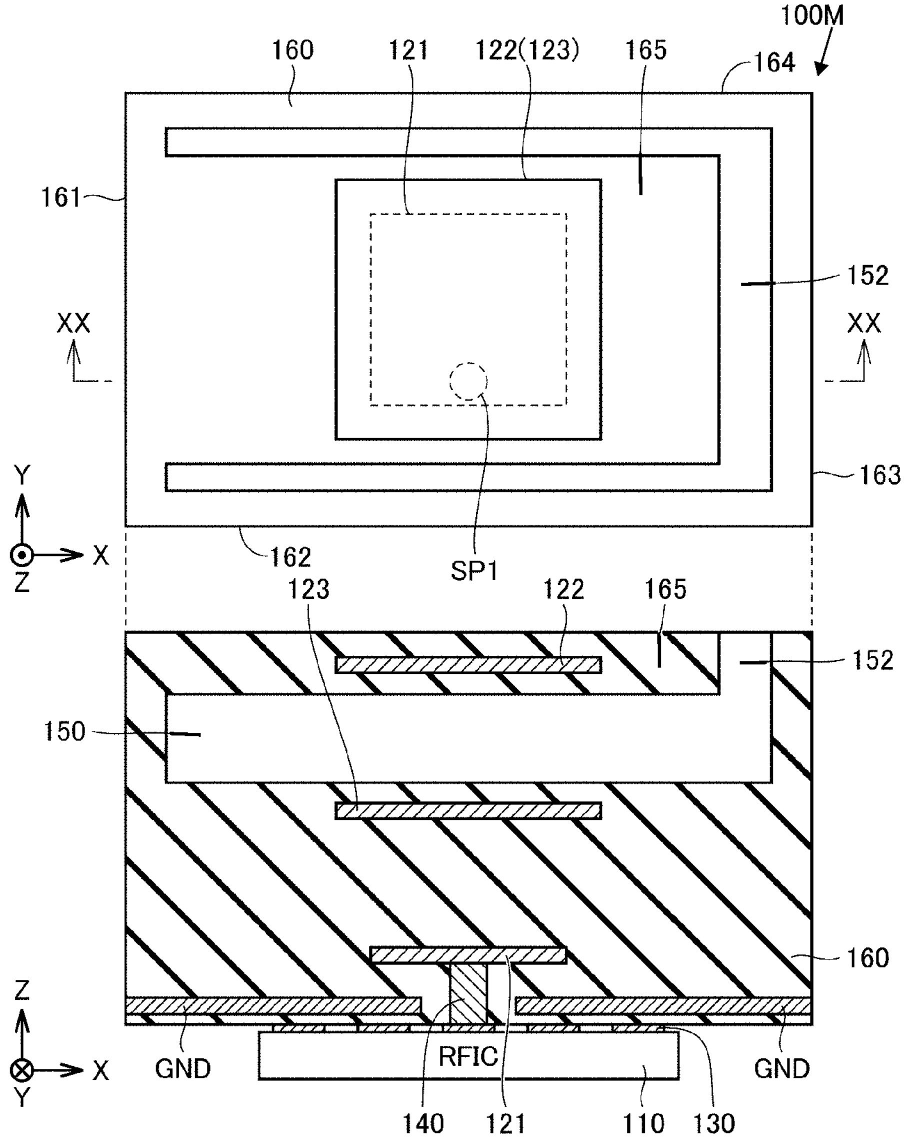
FIG. 23 includes a plan view and a cross-sectional view of an antenna module according to Variation 14.

The layer where the hollow portion 150 is disposed is not limited to the layer between the radiation electrodes 121 and 123. The hollow portion 150 may be disposed between the radiation electrodes 122 and 123, as in an antenna module 100M according to Variation 14 in FIG. 23.

Figure 24:
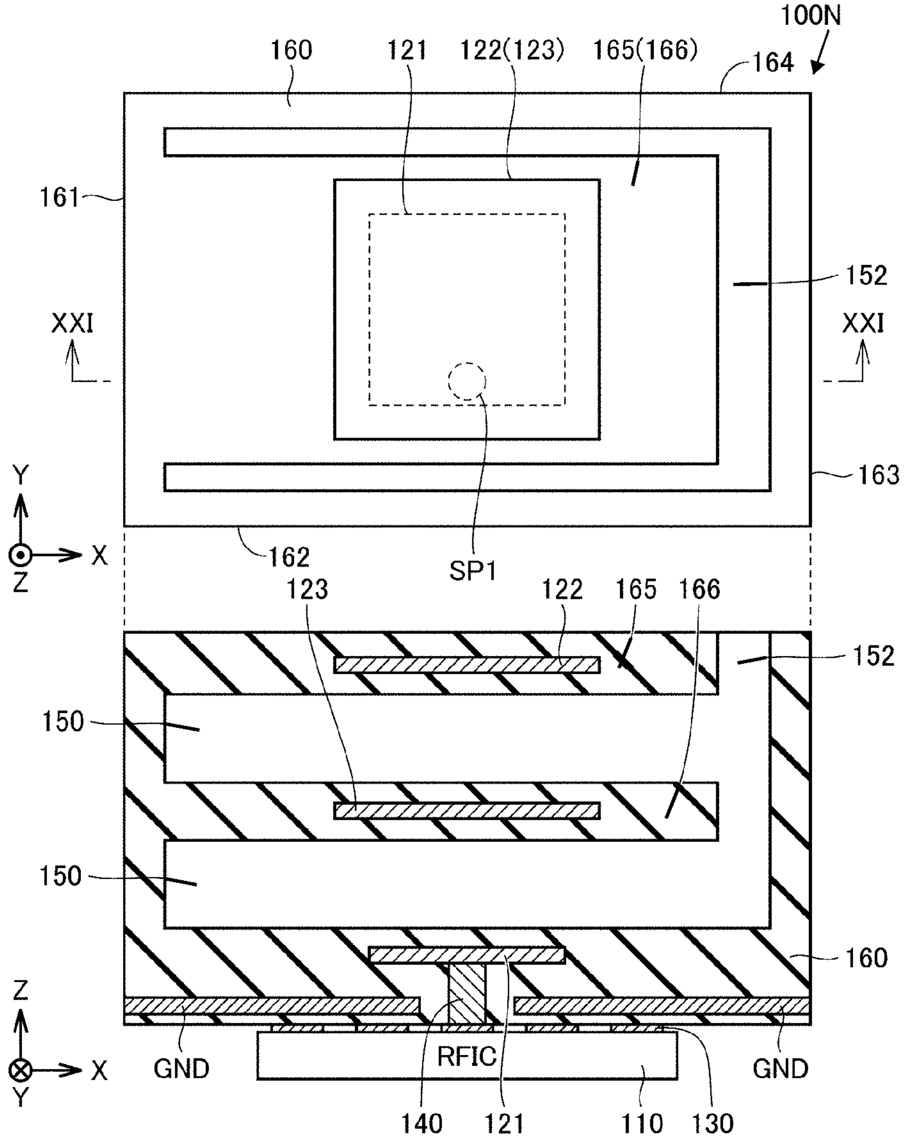
FIG. 24 includes a plan view and a cross-sectional view of an antenna module according to Variation 15.

As in an antenna module 100N according to Variation 15 in FIG. 24, the hollow portion 150 may be disposed both between the radiation electrodes 122 and 123 and between the radiation electrodes 121 and 123. In the antenna module 100N, the radiation electrode 123 is arranged inside a beam portion 166 disposed in a middle area in the lamination direction of the dielectric substrate 160.

Although not illustrated, the hollow portion 150 in the third embodiment may be at least partially filled with the dielectric material having lower permittivity than that of the dielectric material forming the dielectric substrate 160, as in the case of the second embodiment.

In the above-described antenna modules including the three or more stacked radiation electrodes, the expanded frequency band width of a radiated radio wave can be achieved by disposing the hollow portion between any radiation electrodes.

Fourth Embodiment

In each of the antenna modules described in the first to third embodiments, the beam portion 165 where the radiation electrode 122, which is a parasitic element, is arranged includes the upper surface of the dielectric substrate 160.

However, in the configuration in which the hollow portion is an air layer and the cavity portion is open in the upper surface of the dielectric substrate, because the portion supporting the beam portion is limited, the portion supporting the beam portion may be broken, depending on the force acting thereon during handling of the antenna module.

In a fourth embodiment, the beam portion where the radiation electrode is arranged is disposed so as to be supported in a position displaced from the uppermost surface of the dielectric substrate in the lamination direction. In that configuration, the occurrence of incidents in which an external force directly acts on the beam portion during handling is reduced, and the possibility of breakage of the beam portion is decreased.

Figure 25:
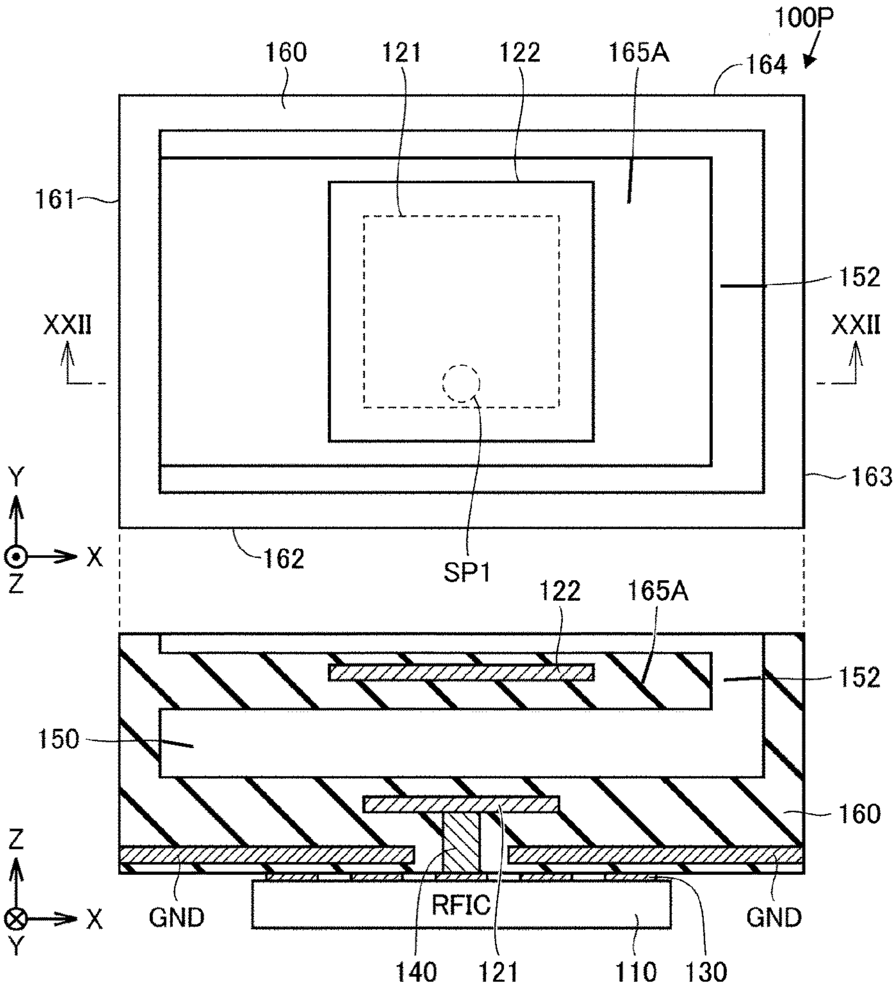
FIG. 25 includes a plan view and a cross-sectional view of an antenna module according to a fourth embodiment.

FIG. 25 includes a plan view and a cross-sectional view of an antenna module 100P according to the fourth embodiment. In the antenna module 100P, as illustrated in the cross-sectional view, a beam portion 165A is disposed in a position displaced from the upper surface of the dielectric substrate 160 toward the negative direction of the Z axis (that is, toward the hollow portion 150). In other words, the level of the outer region of the dielectric substrate 160 is higher than the level of the upper surface of the beam portion 165A. In an example case where antenna modules are stacked, although another antenna module is likely to come into contact with the outer region of the dielectric substrate 160, the occurrence of incidents in which an external force directly acts on the beam portion 165A is reduced in the above-described configuration. Thus, the possibility of breakage of the beam portion 165A can be decreased.

In the example of the antenna module 100P in FIG. 25, the configuration in which the level of the overall outer region of the dielectric substrate 160 is higher than the level of the upper surface of the beam portion 165A is described. The level of the outer region of the dielectric substrate 160 may not entirely be higher, that is, the outer region may not have a wall-like shape. For example, columnar dielectrics may be arranged in part in the outer region of the dielectric substrate 160 such that the uppermost surface of the dielectric substrate 160 is higher than the level of the upper surface of the beam portion 165A.

Fifth Embodiment

In the first to fourth embodiments, the antenna modules including the single unit of the antenna element and the RFIC are described. In a fifth embodiment, an array antenna, in which antenna elements are arranged in an array, is described.

Figure 26:
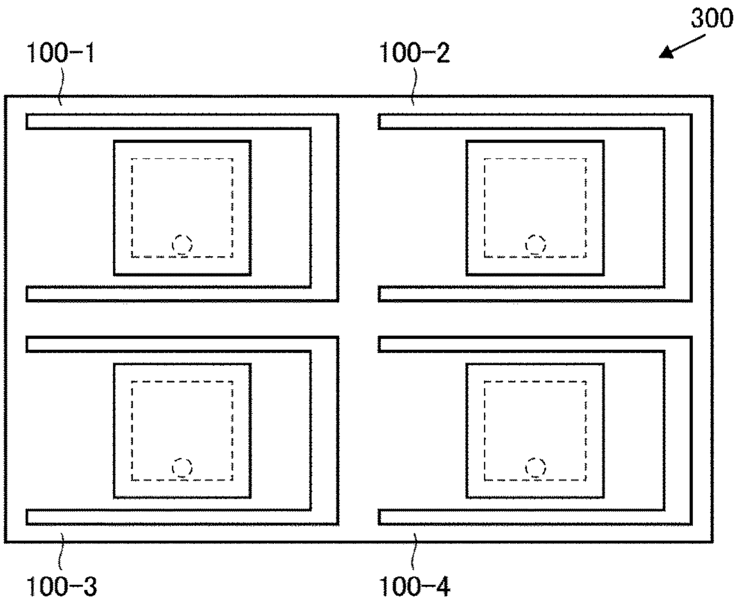
FIG. 26 is a plan view of an antenna array according to a fifth embodiment.

FIG. 26 is a plan view of an array antenna 300 according to the fifth embodiment. The array antenna 300 is a two-by-two array in which four antenna modules 100-1 to 100-4 having the same configuration as the antenna module 100 described in the first embodiment are arranged. The number of antenna modules constituting the array is not limited to four, and it may be two, three, five or more.

In that array antenna 300, the expanded frequency band width of a radiated radio wave can be achieved by disposing the hollow portion between the radiation electrodes in each of the antenna modules. Although not illustrated, in the case of the array antenna, the plurality of antenna modules may include their respective RFICs or may share a single RFIC.

In the case of the array antenna, the dielectric wall between the neighboring antenna modules may be omitted such that the hollow portions communicate with each other.

Figure 27:
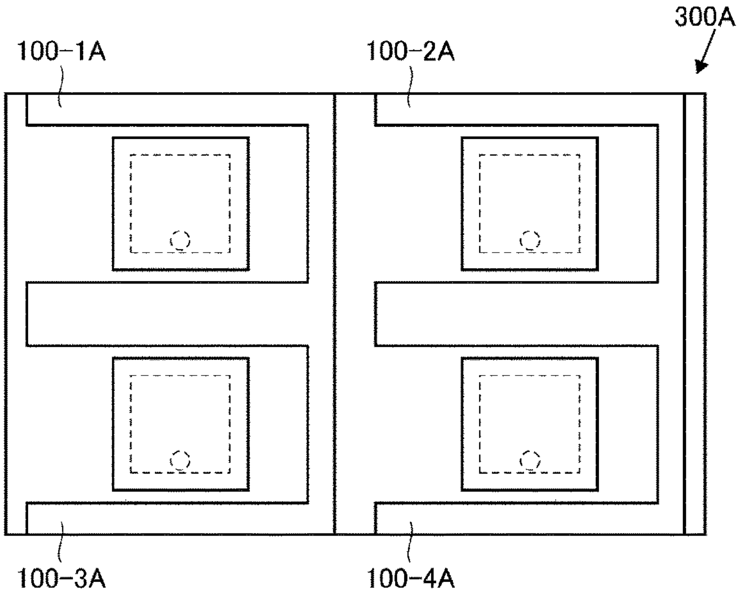
FIG. 27 is a plan view of an antenna array according to Variation 16.

FIG. 27 is a plan view of an array antenna 300A according to Variation 16. In the array antenna 300A, the wall between neighboring antenna modules 100-1A and 100-3A is removed, and the hollow portions in the two antenna modules communicate with each other. The hollow portions in neighboring antenna modules 100-2A and 100-4A also communicate with each other. In the example illustrated in FIG. 27, the walls in the end portions in the Y-axis direction in the antenna modules are also removed.

As described above, because the hollow portions in the neighboring antenna modules in the array antenna communicate with each other, the dielectric section is decreased, and the effective permittivity can be further reduced, and the frequency band width can be still further expanded.

Sixth Embodiment

In a sixth embodiment, a configuration where in a so-called dual-band type antenna module, which can radiate radio waves in two frequency ranges, the expanded frequency band widths of radiated radio waves can be achieved by disposing a hollow in a dielectric substrate is described.

Figure 28:
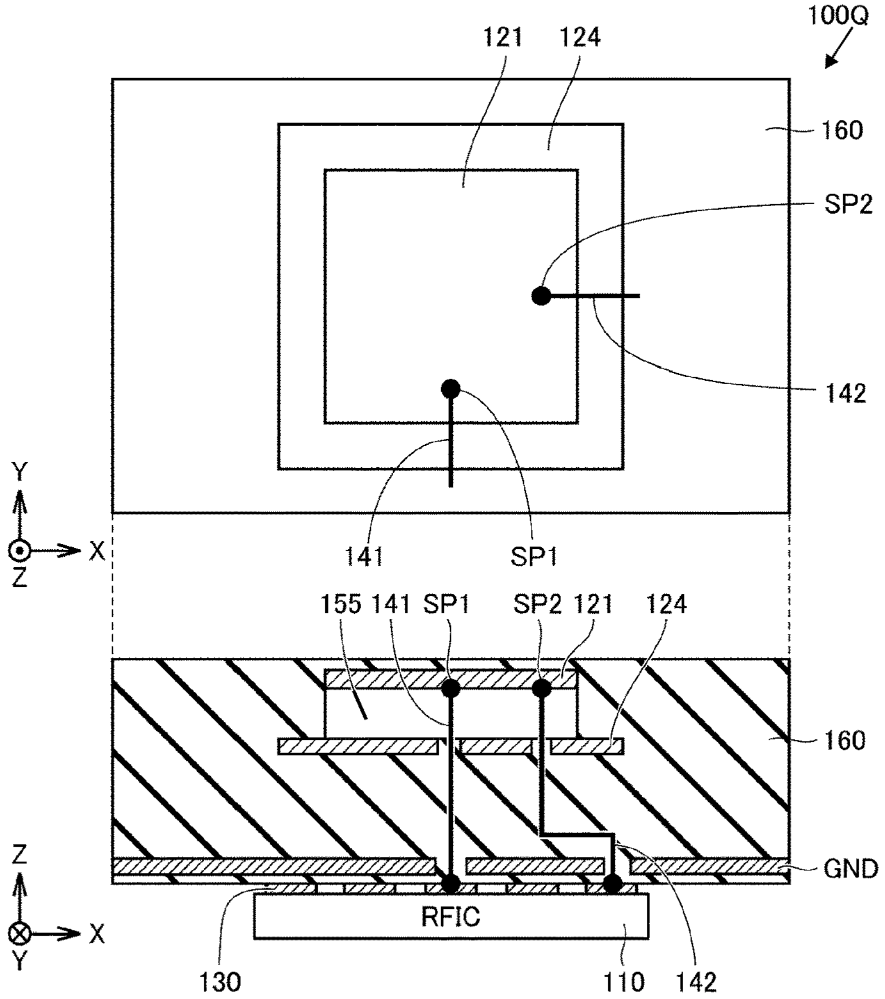
FIG. 28 includes a plan view and a cross-sectional view of an antenna module according to a sixth embodiment.

FIG. 28 includes a plan view and a cross-sectional view of an antenna module 100Q according to the sixth embodiment. Referring to FIG. 28, the antenna module 100Q includes the radiation electrode 121 being a feed element and a radiation electrode 124 being a parasitic element. The radiation electrode 121 is arranged on an inner layer near the upper surface of the dielectric substrate 160. The radiation electrode 124 is arranged on a layer on the lower-surface side with respect to the radiation electrode 121, that is, on a layer between the radiation electrode 121 and the ground electrode GND and is opposite to the radiation electrode 121.

Two feed points SP1 and SP2 are arranged on the radiation electrode 121. The feed point SP1 is arranged in a position displaced from the center of the radiation electrode 121 toward the negative direction of the Y axis when the antenna module 100Q is seen in plan view. A radio-frequency signal is conveyed from the RFIC 110 to the feed point SP1 through a feed line 141. When the radio-frequency signal is supplied to the feed point SP1, a radio wave whose polarization direction is the Y-axis direction is radiated.

The feed point SP2 is arranged in a position displaced from the center of the radiation electrode 121 toward the positive direction of the X axis when the antenna module 100Q is seen in plan view. A radio-frequency signal is conveyed from the RFIC 110 to the feed point SP2 through a feed line 142. When the radio-frequency signal is supplied to the feed point SP2, a radio wave whose polarization direction is the X-axis direction is radiated. That is, the antenna module 100Q is also a dual-polarization type antenna module capable of radiating radio waves in two different polarization directions.

The feed lines 141 and 142 extend from the RFIC 110 through the radiation electrode 124 to the radiation electrode 121. Thus, when radio-frequency signals corresponding to the resonant frequency of the radiation electrode 124 being the parasitic element are supplied to the feed lines 141 and 142, the radiation electrode 124 radiates radio waves.

The size of the radiation electrode 124 is larger than that of the radiation electrode 121. The resonant frequency of the radiation electrode 124 is lower than that of the radiation electrode 121. Thus, the radiation electrode 124 radiates a radio wave in a frequency range lower than that for the radiation electrode 121.

In the antenna module 100Q, a hollow portion 155 is disposed in a layer between the radiation electrodes 121 and 124. When the antenna module 100Q is seen in plan view, the hollow portion 155 has substantially the same shape as that of the radiation electrode 121 and is disposed in a position overlapping the radiation electrode 121.

The radiation electrode 121 functions as an antenna when an electric line of force occurs between the radiation electrodes 121 and 124. Thus, the effective permittivity between the radiation electrodes 121 and 124 has an effect on the antenna characteristics. In the antenna module 100Q, because the hollow portion 155 is disposed in the layer between the radiation electrodes 121 and 124, as described above, the effective permittivity is lower than that when the hollow portion 155 is filled with the dielectric. Therefore, the electromagnetic-field coupling between the radiation electrodes 121 and 124 can be weakened, and the expanded frequency band width of a radio wave radiated by the radiation electrode 121 can be achieved.

The effective permittivity between the radiation electrode 124 and the ground electrode GND has an effect on the frequency band width of the radio wave radiated by the radiation electrode 124. Thus, when the hollow portion 155 is disposed between the radiation electrodes 121 and 124, the frequency band width of the radio wave radiated by the radiation electrode 124 basically remains unchanged. That is, when the hollow portion 155 is disposed between the radiation electrodes 121 and 124, the expanded frequency band width of the radio wave radiated by the radiation electrode 121 can be achieved while at the same time the frequency band width of the radio wave radiated by the radiation electrode 124 is maintained.

Figure 29:
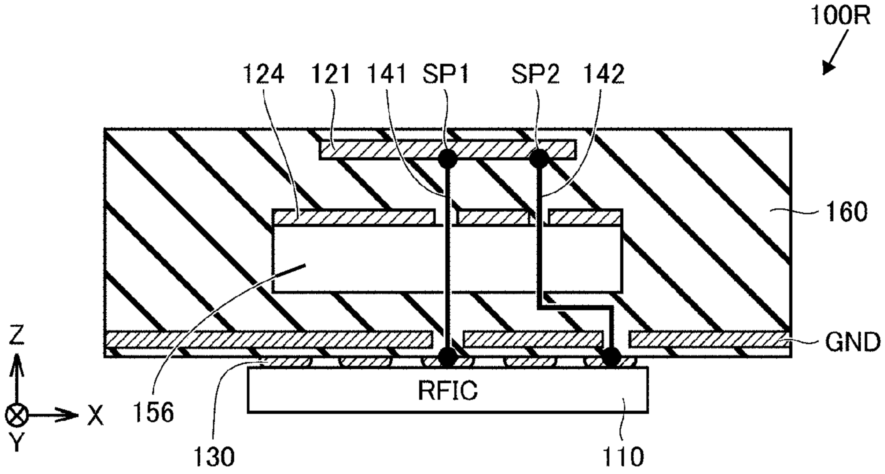
FIG. 29 is a cross-sectional view of an antenna module according to a reference example.

The expanded frequency band width of the radio wave radiated by the radiation electrode 124 can be achieved by disposing a hollow portion 156 in a layer between the radiation electrode 124 and the ground electrode GND, as in an antenna module 100R in a reference example illustrated in FIG. 29.

Furthermore, although not illustrated, the expanded frequency band widths of both the radio wave radiated by the radiation electrode 121 and that by the radiation electrode 124 can be achieved by disposing the hollow portion in each of a layer between the radiation electrodes 121 and 124 and a layer between the radiation electrode 124 and the ground electrode GND.

In the antenna modules illustrated in FIGS. 28 and 29, a portion of each of the feed lines 141 and 142 vertically extends through the hollow portion. One example of the feed line inside the hollow portion may be formed by connecting a columnar conductor to a via or a feed element disposed on a dielectric layer by the use of silver paste. Alternatively, the feed line inside the hollow portion may be formed by laminating small flat-shaped electrodes in the thickness direction. When the technique of connecting a feed element previously formed on a dielectric layer to a feed line is used in connecting the feed line inside the hollow portion and the feed element, the degree of flatness of the feed element can be more ensured, in comparison with the case where a feed element alone is connected to another feed element.

Figure 17:
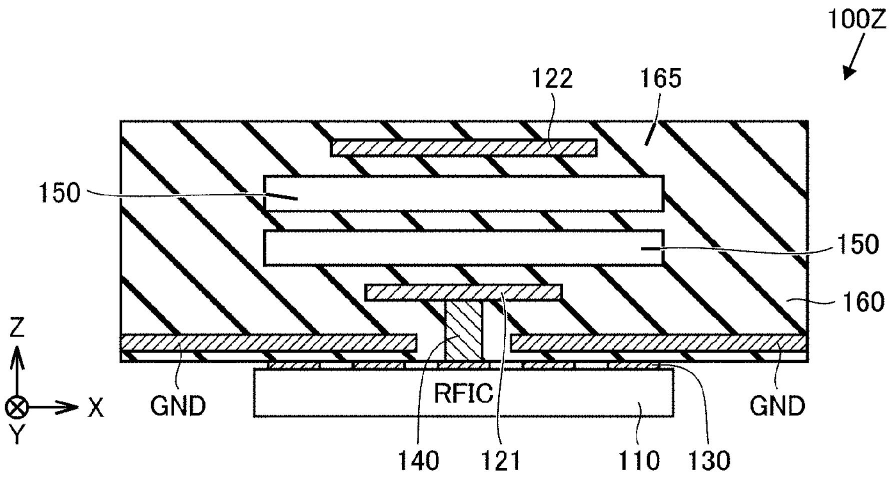
FIG. 17 is a cross-sectional view of an antenna module according to Variation 10.

In the antenna module 100Q in FIG. 28 and the antenna module 100R in FIG. 29, the hollow portions 155 and 156 may consist of sections separated in the lamination direction of the dielectric substrate 160, as in the configuration in FIG. 17.

As described above, in dual-band type antenna modules including the two stacked radiation electrodes and capable of radiating radio waves in different frequency ranges, the frequency band width of each of the radio waves can be individually adjusted by disposing the hollow portion in the layer between the two radiation electrodes and/or the layer between the radiation electrode on the low-frequency side and the ground electrode.

It is to be understood that the embodiments disclosed here are illustrative and not restrictive in all respects. The scope of the present disclosure is indicated by not the above description of the embodiments but the claims, and it is intended to include all changes in the meaning and scope equivalent to the claims.

10 communication device, 100, 100A to 100N, 100P to 100R, 100X to 100Z antenna module, 110 RFIC, 111A to 111D, 113A to 113D, 117 switch, 112AR to 112DR low-noise amplifier, 112AT to 112DT power amplifier, 114A to 114D attenuator, 115A to 115D, phase shifter, 116 signal combiner/splitter, 118 mixer, 119 amplifier circuit, 120 antenna array, 121 to 124 radiation electrode, 130 solder bump, 140 to 142 feed line, 145 columnar conductor, 150, 155, 156 hollow portion, 152 cavity portion, 160 dielectric substrate, 161 to 164 side, 165, 165A, 166 beam portion, 167 wall portion, 170, 171 dielectric material, 300, 300A array antenna, GND ground electrode, SP1, SP1A, SP2 feed point

The invention claimed is:

1. An antenna module comprising:
a dielectric substrate having a multilayer structure;
a first radiation electrode;
a ground electrode; and
a second radiation electrode arranged between the first radiation electrode and the ground electrode in a lamination direction of the dielectric substrate,
wherein a hollow portion is disposed in at least a portion between the first radiation electrode and the second radiation electrode in the dielectric substrate,
wherein a cavity portion extending from an upper surface of the dielectric substrate through the dielectric substrate to the hollow portion is disposed in the dielectric substrate.

2. The antenna module according to claim 1, wherein when the dielectric substrate is seen in a plan view, an entire area of the first radiation electrode and the second radiation electrode overlaps the hollow portion.

3. The antenna module according to claim 1, wherein the dielectric substrate has a substantially rectangular shape having a first side, a second side, a third side and a fourth side,
the dielectric substrate includes a beam portion, the first radiation electrode is arranged in the beam portion, and the beam portion is supported by the first side of the dielectric substrate, and
the cavity portion is disposed along the second side, the third side and the fourth side around the beam portion.

4. The antenna module according to claim 3, wherein the second side is adjacent to the first side,
the second radiation electrode is a feed element, and
when the antenna module is seen in a plan view, a feed point for the second radiation electrode is arranged in a position displaced from a center of the second radiation electrode toward the second side.

5. The antenna module according to claim 4, wherein the beam portion is disposed in a position displaced from the upper surface of the dielectric substrate toward the hollow portion in the lamination direction.

6. The antenna module according to claim 3, wherein the beam portion is disposed in a position displaced from the upper surface of the dielectric substrate toward the hollow portion in the lamination direction.

7. The antenna module according to claim 1, wherein the dielectric substrate has a substantially rectangular shape having a first side, a second side, a third side and a fourth side, the first side and the third side are opposite to each other, the dielectric substrate includes a beam portion, the first radiation electrode is arranged in the beam portion, and the beam portion is supported by the first side and the third side of the dielectric substrate, and the cavity portion is disposed along the second side and the fourth side around the beam portion.

8. The antenna module according to claim 7, wherein the beam portion is disposed in a position displaced from the upper surface of the dielectric substrate toward the hollow portion in the lamination direction.

9. The antenna module according to claim 1, wherein the dielectric substrate has a substantially rectangular shape having a first side, a second side, a third side and a fourth side, the second side and the fourth side are adjacent to the first side, the third side is opposite to the first side, the dielectric substrate includes a beam portion, the first radiation electrode is arranged in the beam portion, and the beam portion is supported by the first side, the second side, and the fourth side of the dielectric substrate, and the cavity portion is disposed along the third side around the beam portion.

10. The antenna module according to claim 1, wherein when the antenna module is seen in a plan view, the hollow portion overlaps at least a portion of an end portion of the first radiation electrode in a polarization direction of a radio wave radiated by the antenna module.

11. The antenna module according to claim 1, wherein the first radiation electrode is a parasitic element, and the second radiation electrode is a feed element.

12. The antenna module according to claim 1, further comprising a third radiation electrode arranged between the first radiation electrode and the second radiation electrode in the lamination direction of the dielectric substrate, wherein the hollow portion is disposed at least one of between the first radiation electrode and the third radiation electrode and between the second radiation electrode and the third radiation electrode.

13. The antenna module according to claim 1, wherein at least a portion of the hollow portion is filled with a dielectric material having permittivity lower than the dielectric substrate.

14. The antenna module according to claim 1, wherein the dielectric substrate includes a plurality of columnar conductors arranged along an outer region of the dielectric substrate.

15. The antenna module according to claim 1, further comprising a feeder circuit configured to supply radio-frequency power to the feed element in the antenna module.

16. A communication device on which the antenna module according to claim 1 is mounted.

17. An antenna module comprising:

a dielectric substrate having a multilayer structure;

a first radiation electrode;

a ground electrode; and a second radiation electrode arranged between the first radiation electrode and the ground electrode in a lamination direction of the dielectric substrate, wherein a hollow portion is disposed in at least a portion between the first radiation electrode and the second radiation electrode in the dielectric substrate, wherein a cavity portion extending from an upper surface of the dielectric substrate through the dielectric substrate to the hollow portion is disposed in the dielectric substrate, wherein when the dielectric substrate is seen in a plan view, an entire area of the first radiation electrode and the second radiation electrode overlaps the hollow portion, wherein a cavity portion extending from an upper surface of the dielectric substrate through the dielectric substrate to the hollow portion is disposed in the dielectric substrate.

* * * * *